United States Patent
Thomsen

(10) Patent No.: US 12,460,469 B2
(45) Date of Patent: Nov. 4, 2025

(54) VACUUM INSULATED PANEL WITH CERAMIC SPACERS

(71) Applicant: LuxWall, Inc., Ypsilanti, MI (US)

(72) Inventor: Scott V. Thomsen, Glen Arbor, MI (US)

(73) Assignee: LuxWall, Inc., Ypsilanti, MI (US)

(*) Notice: Subject to any disclaimer, the term of this patent is extended or adjusted under 35 U.S.C. 154(b) by 217 days.

(21) Appl. No.: 18/517,044

(22) Filed: Nov. 22, 2023

(65) Prior Publication Data
US 2024/0167317 A1    May 23, 2024

Related U.S. Application Data

(60) Provisional application No. 63/540,729, filed on Sep. 27, 2023, provisional application No. 63/427,656, filed on Nov. 23, 2022.

(51) Int. Cl.
*E06B 3/663* (2006.01)

(52) U.S. Cl.
CPC ................ *E06B 3/66304* (2013.01)

(58) Field of Classification Search
CPC .... B32B 7/02; B32B 7/04; B32B 7/05; B32B 7/12; B32B 17/06; B32B 18/00; B32B 33/00; B32B 7/00; E06B 3/66; E06B 3/6612; E06B 3/663; E06B 3/66304; C03C 27/06; Y02A 80/22; Y02A 30/249; Y02B 30/249; Y02B 80/22
USPC ........ 428/34; 52/783.1, 786.1, 786.13, 788.1
See application file for complete search history.

(56) References Cited

U.S. PATENT DOCUMENTS

| | | | |
|---|---|---|---|
| 3,179,549 A * | 4/1965 | Strong | F17C 13/001 220/592.27 |
| 3,433,611 A | 3/1969 | Saunders et al. | |
| 5,124,185 A | 6/1992 | Kerr et al. | |
| 5,657,607 A | 8/1997 | Collins | |
| 5,664,395 A | 9/1997 | Collins | |
| 5,935,702 A | 8/1999 | Macquart et al. | |
| 6,042,934 A | 3/2000 | Guiselin et al. | |
| 6,322,881 B1 | 11/2001 | Boire et al. | |
| 6,352,749 B1 | 3/2002 | Aggas | |
| 6,533,632 B1 | 3/2003 | Dynka | |
| 6,558,494 B1 | 5/2003 | Wang et al. | |
| 6,641,689 B1 | 11/2003 | Aggas | |
| 6,946,171 B1 | 9/2005 | Aggas | |

(Continued)

FOREIGN PATENT DOCUMENTS

EP    1 563 952 B1    6/2013

OTHER PUBLICATIONS

PCT International Search Report dated Mar. 22, 2024 for PCT/US2023/080891.

(Continued)

*Primary Examiner* — Maria V Ewald
*Assistant Examiner* — Ethan A. Utt
(74) *Attorney, Agent, or Firm* — Nixon & Vanderhye P.C.

(57) ABSTRACT

A vacuum insulating panel includes first and second substrates (e.g., glass substrates), a hermetic edge seal, a pump-out port, and spacers sandwiched between at least the two substrates. The gap between the substrates may be at a pressure less than atmospheric pressure to provide insulating properties. The vacuum insulating panel may include ceramic (e.g., aluminosilicate glass) spacers, which may be chemically strengthened.

58 Claims, 8 Drawing Sheets

(56) References Cited

U.S. PATENT DOCUMENTS

| | | | |
|---|---|---|---|
| 7,045,181 B2 | 5/2006 | Yoshizawa et al. | |
| 7,115,308 B2 | 10/2006 | Amari et al. | |
| 7,314,668 B2 | 1/2008 | Lingle et al. | |
| 7,342,716 B2 | 3/2008 | Hartig | |
| 7,407,423 B2 | 8/2008 | Aitken et al. | |
| 7,425,166 B2 | 9/2008 | Burt et al. | |
| 7,560,402 B2 | 7/2009 | Thomsen | |
| 7,632,571 B2 | 12/2009 | Hartig et al. | |
| 7,858,193 B2 | 12/2010 | Ihlo et al. | |
| 7,910,229 B2 | 3/2011 | Medwick et al. | |
| 7,919,157 B2 | 4/2011 | Cooper | |
| 8,490,434 B2 | 7/2013 | Watanabe et al. | |
| 8,500,933 B2 | 8/2013 | Cooper | |
| 8,590,343 B2 | 11/2013 | Wang | |
| 8,821,999 B2 | 9/2014 | Grzybowski et al. | |
| 8,833,105 B2 | 9/2014 | Dennis et al. | |
| 8,951,617 B2 | 2/2015 | Reymond et al. | |
| 9,169,155 B2 | 10/2015 | Dennis et al. | |
| 9,215,760 B2 | 12/2015 | Fischer et al. | |
| 9,290,984 B2 | 3/2016 | Hogan et al. | |
| 9,388,628 B2 | 7/2016 | Petrmichl et al. | |
| 9,428,952 B2 | 8/2016 | Dennis et al. | |
| 9,441,416 B2 | 9/2016 | Veerasamy et al. | |
| 9,458,052 B2 | 10/2016 | Dennis | |
| 9,593,527 B2 | 3/2017 | Hogan et al. | |
| 9,752,375 B2 | 9/2017 | Jones | |
| 9,776,910 B2 | 10/2017 | Dennis | |
| 9,822,580 B2 | 11/2017 | Cooper et al. | |
| 9,908,811 B2 | 3/2018 | Gross et al. | |
| 10,011,525 B2 | 7/2018 | Logunov et al. | |
| 10,017,417 B2 | 7/2018 | Dejneka et al. | |
| 10,087,676 B2 | 10/2018 | Dennis | |
| 10,107,028 B2 | 10/2018 | Dennis | |
| 10,125,045 B2 | 11/2018 | Dennis | |
| 10,153,389 B2 | 12/2018 | Godeke et al. | |
| 10,267,085 B2 | 4/2019 | Dennis et al. | |
| 10,280,680 B2 | 5/2019 | Veerasamy et al. | |
| 10,421,684 B2 | 9/2019 | Hogan et al. | |
| 10,435,938 B2 | 10/2019 | Dennis et al. | |
| 10,465,433 B2 | 11/2019 | Hogan et al. | |
| 10,731,403 B2 | 8/2020 | Krisko et al. | |
| 10,752,535 B2 | 8/2020 | Dennis | |
| 10,759,693 B2 | 9/2020 | Xu et al. | |
| 10,829,984 B2 | 11/2020 | Dennis et al. | |
| 10,858,880 B2 | 12/2020 | Dennis | |
| 10,954,160 B2 | 3/2021 | Streltsov et al. | |
| 11,014,847 B2 | 5/2021 | Dennis | |
| 11,028,009 B2 | 6/2021 | Dennis | |
| 11,028,637 B2 | 6/2021 | Abe et al. | |
| 11,124,450 B2 | 9/2021 | Miki et al. | |
| 11,285,703 B2 | 3/2022 | Jorgensen et al. | |
| 2002/0187299 A1* | 12/2002 | Jousse | C03B 37/14 428/80 |
| 2009/0155555 A1 | 6/2009 | Botelho et al. | |
| 2012/0131959 A1 | 5/2012 | No et al. | |
| 2012/0202049 A1* | 8/2012 | Valladeau | C03C 12/00 501/33 |
| 2013/0101759 A1 | 4/2013 | Jones | |
| 2013/0139948 A1* | 6/2013 | Raggio | B28D 1/225 427/523 |
| 2016/0297706 A1 | 10/2016 | Naito et al. | |
| 2018/0238104 A1 | 8/2018 | Mikkelsen et al. | |
| 2021/0254395 A1 | 8/2021 | Nielsen et al. | |
| 2021/0262279 A1 | 8/2021 | Hedeby et al. | |
| 2021/0270084 A1 | 9/2021 | Abe et al. | |
| 2022/0025697 A1 | 1/2022 | Nielsen | |
| 2022/0074258 A1 | 3/2022 | Andersen et al. | |
| 2022/0127901 A1 | 4/2022 | Nakazawa et al. | |
| 2022/0235601 A1 | 7/2022 | Krisko et al. | |

OTHER PUBLICATIONS

PCT Written Opinion dated Mar. 22, 2024 for PCT/US2023/080891.

Li et al., "Glass forming region and bonding mechanism of low melting V2O5TeO2Bi2O3 glass applied in vacuum glazing sealing", Mar. 9, 2021, pp. 1-17, American Ceramic Society.

Modeling of Vacuum Insulating Glazing, Published by Ashrae; by Hart et al.; 7pgs. (Dec. 2013).

Laser Assisted Frit Sealing for High Thermal Expansion Glasses; *JLMN-Journal of Laser Micro/Nanoengineering* vol. 7, No. 3, 2012, by Logunov et al.; 8 pgs (Dec. 2012).

Vacuum Insulated Glazing under the Influence of a Thermal Load; 2 pgs; by Aronen et al. (Jul. 2020).

Edge Conduction in Vacuum Glazing; Presented at Thermal Performance of the Exterior Envelopes of Buildings VI, Clearwater Beach, FL, Dec. 4-8, 1995, by Simko et al.; 14pgs (Dec. 1995).

U.S. Appl. No. 18/376,897, filed Oct. 5, 2023.
U.S. Appl. No. 18/376,473, filed Oct. 4, 2023.
U.S. Appl. No. 18/376,900, filed Oct. 5, 2023.
U.S. Appl. No. 18/376,907, filed Oct. 5, 2023.
U.S. Appl. No. 18/376,479, filed Oct. 4, 2023.
U.S. Appl. No. 18/376,483, filed Oct. 4, 2023.
U.S. Appl. No. 18/376,490, filed Oct. 4, 2023.
U.S. Appl. No. 18/376,495, filed Oct. 4, 2023.
U.S. Appl. No. 18/376,926, filed Oct. 5, 2023.
U.S. Appl. No. 18/376,914, filed Oct. 5, 2023.
U.S. Appl. No. 18/376,503, filed Oct. 4, 2023.
U.S. Appl. No. 18/379,275, filed Oct. 12, 2023.
U.S. Appl. No. 18/379,285, filed Oct. 12, 2023.
U.S. Appl. No. 18/376,932, filed Oct. 5, 2023.
U.S. Appl. No. 18/377,328, filed Oct. 6, 2023.
U.S. Appl. No. 18/377,335, filed Oct. 6, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.

\* cited by examiner

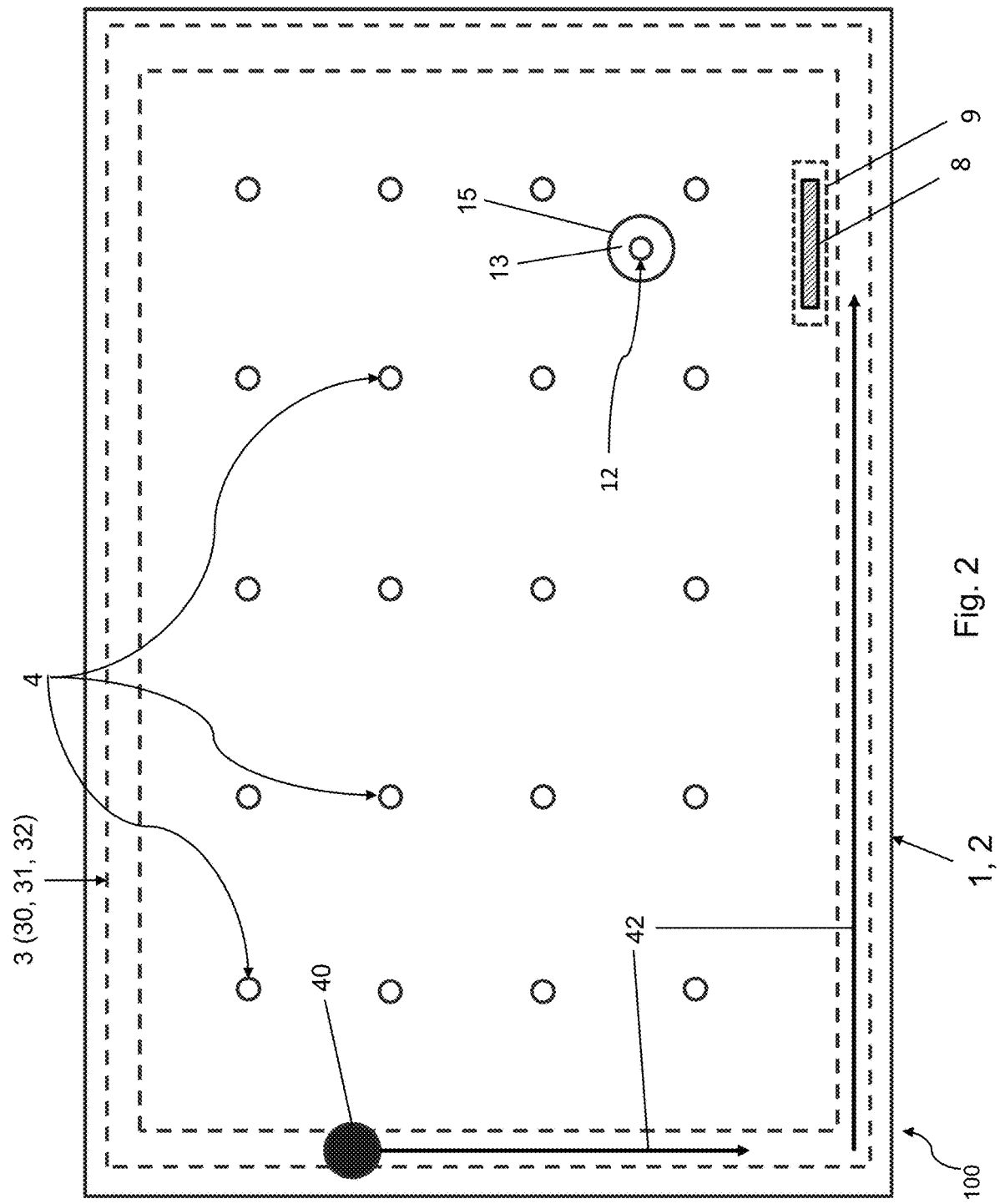

VACUUM INSULATED PANEL WITH CERAMIC SPACERS

CROSS-REFERENCE TO RELATED APPLICATIONS

This application is related to and claims priority on U.S. Provisional Application No. 63/540,729, filed Sep. 27, 2023, the disclosure of which is hereby incorporated herein by reference in its entirety for all purposes. This application is also related to and claims priority on U.S. Provisional Application No. 63/427,656, filed Nov. 23, 2022.

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664,395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

Metal spacers, such as spacers made of stainless steel, are known in the art. Metal spacers/pillars have been used for their ductility, Mohs hardness, bulk compression under 1E-7 torr vacuum loads, and ability to shape the spacers. A common metal spacer/pillar material is annealed or hardened stainless steel with a thermal conductivity of about 14.6 W/mC, versus soda lime glass substrates with a thermal conductivity of about 1.08 W/mC.

An example drawback of metal spacers/pillars is that they often cannot support vacuum stress loading beyond a given spacer separation distance, such as a spacer separation distance of about 40 mm for a 0.5 mm diameter spacer/pillar. Finite element modeling signals that a stainless steel spacer (e.g., pillar) should have a pillar spacing of about 40 mm and not greater than 50 mm due to the shear modulus, elastic shear stiffness, being about 74 GPa to about 81 GPa, Youngs Modulus, material stiffness, being about 200 GPa, and compressive stress being about 205 MPa to about 310 MPa. A stainless steel pillar with a pillar spacing of 40 mm under 1E-7 torr vacuum loads can experience 1,286 MPa of induced stress in the pillar, Von Mises stress, and at 60 mm an induced stress of 2,107 MPa. The stainless steel pillar will undergo plastic deformation of the pillar thickness and contribute to increased glass deflection between the pillars because of the stress of the stainless pillar and the pillar to glass interface can reach stress levels as high as 975 MPa under wind load and asymmetric thermal shock conditions. The modulus of rupture of stainless steel is about 205 MPa to about 310 MPa which is well below the induced tensile and Von Mises stresses induced under vacuum loads. A stainless steel pillar array with 60 mm pillar spacing under 1E-7 torr vacuum loads can experience micro-cracking at the glass substrate to pillar interface due to a materials mismatch in Youngs Modulus, shear modulus, and tensile strength. Thus, it has been found by the inventors that stainless steel spacers (e.g., pillars) have undesirably low compressive stress of from about 205-310 MPa for large pillar spacing techniques (e.g., above 40 mm for example).

Metal spacers also have a much different CTE compared to opposing glass substrates (e.g., 15×10E-6 to 20×10E-6 for metal versus 9.0×10E-6 for soda lime glass substrates). The thermal mismatch between the glass substrates and metal pillars is magnified under asymmetric thermal loading conditions, such as −30 degrees C. on the exterior of the window and +25 degree C. on the interior of the window. The movement of the interior and exterior glass substrates combined with the pillar to glass substrate CTE delta results in the pillar significantly moving in the x, y, and z directions. As the pillar moves due to vacuum insulating unit thermal conditions the pillar creates micro-cracks in the glass substrates. The metal pillar Youngs Modulus is 2.8 times greater than the glass substrates, and the shear modulus is 2 times greater than the glass substrates.

The diameter of metal spacers/pillars can be increased for example from about 0.5 mm to about 0.75 mm and to about 1.5 mm, but at the expense of being more visible, negatively impacting the u-factor of the vacuum insulating panel due to the increased pillar surface area leading to higher thermal transfer between the glass substrates due to conduction, and increasing unit cost. For example, a vacuum insulating unit with 40 mm spacing with 0.5 mm diameter pillars may have a u-factor of 0.40 W/mK, 0.75 mm diameter pillars may have a u-factor of 0.60 W/mK, and 1.00 mm diameter pillars may have a u-factor of 0.80 W/mK. The closer the spacers/pillars are placed to each other in the low pressure gap of a vacuum insulating panel, the higher the u-factor of the panel due to conduction energy losses from one glass substrate to the other glass substrate through the metal spacers/pillars. The lower the u-factor, the better a window insulates, resulting in a faster financial payback period for the window. A low u-factor is desirable. Too many pillars/spacers, too close together, can also be aesthetically displeasing.

Moreover, certain transparent spacer/pillar materials have been developed for vacuum insulated panels. Some, such as corundum, sapphire, alpha-alumina, and aluminum oxide, may have a high Mohs hardness to increase pillar separation. However, a drawback of such materials may be related to the high Mohs hardness of the bulk material. For example, such materials may have a Mohs hardness of about 8.0 to about 9.5, compared to from about 5.0 to 5.5 for soda lime silica based float glass. When a vacuum insulated glass unit is exposed to asymmetric thermal shock on the order of 50 degrees C. to 90 degrees C. for example, the opposing glass substrates move in opposite directions which causes the spacers/pillars to move between the two lites. The movement of the spacers/pillars can induce hertzian cracks in the glass substrates due to the spacer/pillar hardness being significantly higher than the glass substrates. Metal pillar movement is increased due to the large difference in CTE between the pillar and the glass substrate(s). The rate of glass cracking and breakage is increased if the high hardness spacer/pillar contains a surface defect or if one of the opposing glass substrates contain a surface or bulk defect.

In certain example embodiments, there may be provided a vacuum insulating panel which may comprise: a first glass substrate; a second glass substrate; a plurality of spacers provided in a gap between at least the first and second substrates, wherein the gap is at pressure less than atmospheric pressure; a seal provided at least partially between at least the first and second substrates; and wherein each of the plurality of spacers may comprise ceramic material, and may comprise a compressive stress region and a tension stress region, wherein compressive stress in at least part of the compressive stress region may be at least about 400 MPa (more preferably at least about 600 MPa, more preferably at least about 700 MPa, more preferably at least about 800 MPa, and possibly at least about 900 MPa), and tensile stress in at least part of the tension stress region may be at least about 25 MPa.

In certain example embodiments, there may be provided a vacuum insulating panel which may comprise: a first glass substrate; a second glass substrate; plurality of ceramic spacers provided in a gap between at least the first and second substrates, wherein the gap is at pressure less than atmospheric pressure; a seal provided at least partially between at least the first and second substrates; and wherein at least one of the plurality of ceramic spacers may be chemically strengthened (e.g., via at least one ion exchange process).

In certain example embodiments, there may be provided a vacuum insulating panel which may comprise: a first glass substrate; a second glass substrate; a plurality of spacers provided in a gap between at least the first and second substrates, wherein the gap is at pressure less than atmospheric pressure; a seal provided at least partially between at least the first and second substrates; wherein at least one of the plurality of spacers may: be chemically strengthened, comprises glass, and have a Mohs hardness of from about 5.0 to 6.0; and wherein spacing between adjacent spacers at at least one location in the panel may be at least about 40 mm, more preferably at least about 45 mm, more preferably at least about 55 mm, and most preferably at least about 60 mm.

Technical advantage(s), for example, include one or more of: (a) a spacer(s) with sufficient compressive strength to allow for a spacer separation distance, in at least one area of the panel as viewed from above, of at least about 40 mm, more preferably of at least about 45 mm, more preferably of at least about 50 mm, and most preferably of at least about 55 mm or 60 mm, to reduce heat transfer between the substrates and thus improve u-factor and/or aesthetics of the panel; (b) spacer(s) having a Mohs hardness close to that of substrates of the panel, such as from about 4.5 to 6.5, more preferably from about 5.0 to 6.0, to reduce hertzian cracks resulting from asymmetric thermal conditions and/or wind loads, (c) a spacer(s) which is substantially transparent to visible light, such as being transparent to at least about 50%, more preferably at least about 60%, more preferably at least about 70%, of visible light, so as to provide for an aesthetically pleasing panel; (d) a spacer(s) having a coefficient of thermal expansion (CTE) closely approximating that of the opposing glass substrates to reduce spacer movement during thermal exposure and improve panel durability, (e) a spacer(s) having a thermal conductivity similar to that of the opposing glass substrates to help u-factor of the panel, (f) a spacer(s) comprising compressive surface region stress sufficient to support desirable loads, such as for example loading under 1E-7 torr vacuum pressure, (g) a spacer(s) with sufficient plastic deformation, (h) a spacer(s) having a refractive index of from about 1.40 to 1.65, more preferably from about 1.45 to 1.55, to reduce visibility and/or reflectance and improve aesthetics of the panel; (i) a spacer(s) having an extinction coefficient at 550 nm of no greater than about 0.020, more preferably no greater than about 0.010, to reduce visibility and improve aesthetics of the panel; (j) a spacer(s) comprising surface region compressive stress and central region tensile stress for providing desirable strength and reducing spacer defects and/or ruptures under load; and/or (k) a spacer(s) comprising a Youngs Modulus and Shear Modulus similar to that of at least one of the glass substrates to reduce or minimize spacer induced glass defects.

BRIEF DESCRIPTION OF THE DRAWINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

FIG. 2 is a schematic top view of a vacuum insulating unit/panel according to an example embodiment (including a top view of the panel of FIG. 1), showing a laser used in forming the edge seal during manufacturing, which may be used in combination with any embodiment herein.

DETAILED DESCRIPTION

Figure 1:
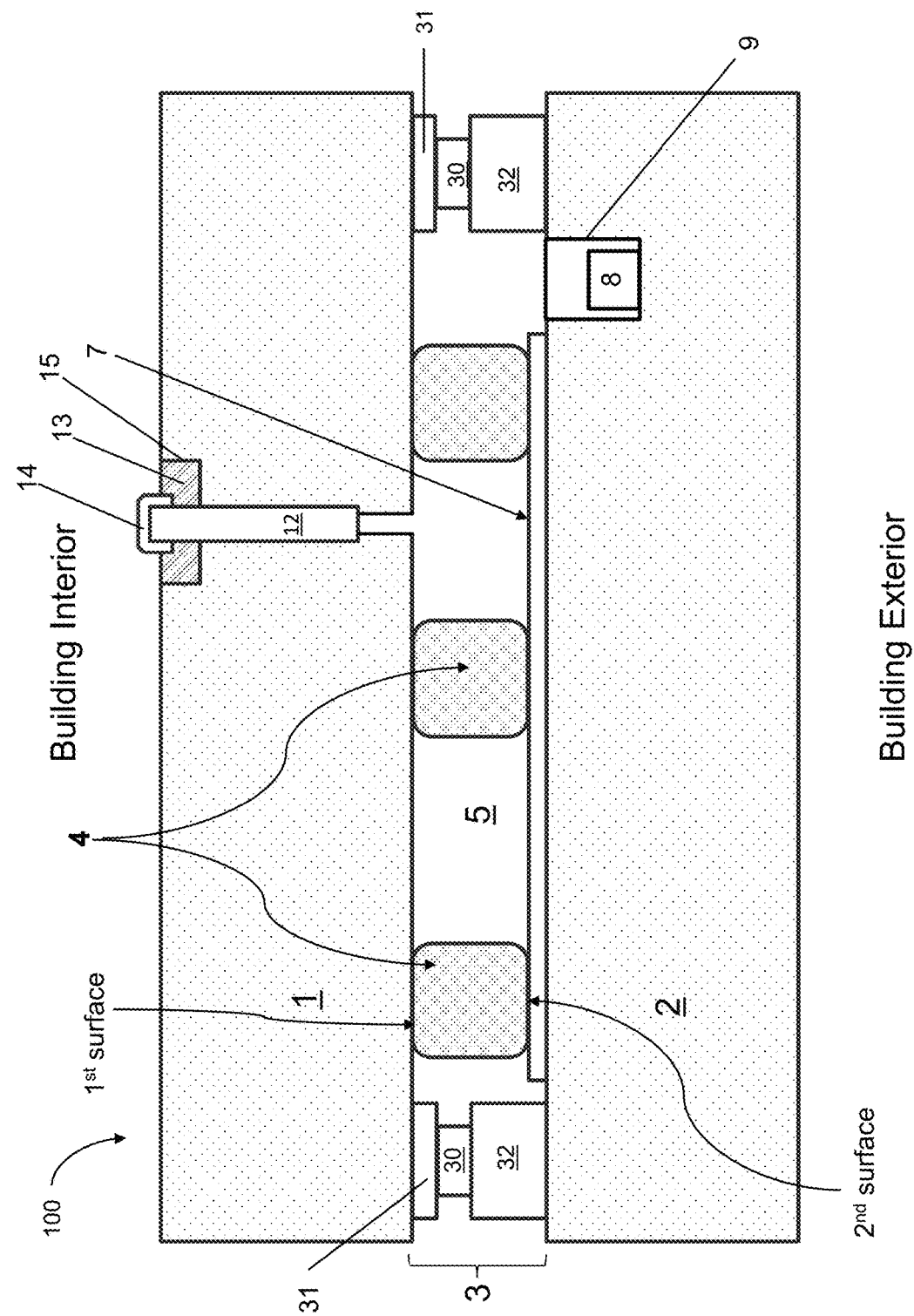
FIG. 1 is a side cross sectional view of a vacuum insulating unit/panel according to an example embodiment.

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

FIG. 1 is a side cross sectional view illustrating a vacuum insulating panel 100 according to various example embodiments, and FIG. 2 is a schematic top view of an example vacuum insulating unit/panel 100 (e.g., the panel of FIG. 1) showing a laser used in sintering/firing the main seal layer 30 when forming the edge seal 3 during manufacturing (which may be used in combination with any embodiment herein). FIG. 1 illustrates an embodiment where the edge seal 3 is spaced inwardly from the absolute edge of the panel 100, the width of the main seal layer 30 is less than a width(s) of the primer layers 31 and 32, and a thickness of the main seal layer 30 is greater than a thickness of primer seal layer 31 but less than a thickness of the other primer seal layer 32. However, one or more of these features can be changed in various example embodiments. FIG. 2 is a top view illustrating the laser beam 40 proceeding around the entire periphery of the panel along path 42 over the edge seal layers 30-32 to fire/sinter the main edge seal layer 30 in forming the hermetic edge seal 3. The laser beam 40 performs localized heating of the edge seal area, so as to not unduly heat certain other areas of the panel thereby reducing chances of significant de-tempering of the glass substrates. Each of these embodiments may be used in combination with any other embodiment described herein, in whole or in part. It should be noted that, in practice, such vacuum insulating panels/units may be oriented upside down or sideways from the orientations illustrated in FIGS. 1-2. Vacuum insulating panel 100 may be used in window applications (e.g., for commercial and/or residential windows), and/or for other applications such as commercial refrigeration and consumer appliance applications.

Referring to FIGS. 1-2, a vacuum insulating panel 100 may include a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, possibly with non-uniform surface features from thermal heat treatment of the glass, in certain example embodiments. Support spacers 4, sometimes referred to as pillars, may be of any suitable shape (e.g., round, oval, disc-shaped, puck-shaped, square, rectangular, rod-shaped, etc.) and may be of or include a ceramic material such as glass. Certain example support spacers 4 shown in the figures are substantially circular as viewed from above (e.g., see FIGS. 2-3) and substantially rectangular as viewed in cross section (e.g., see FIGS. 1 and 4), and may have rounded edges. However, spacers 4 may be of any suitable shape. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 (e.g., see low-E coating 7 on substrate 2 in FIG. 1) in order to further improve insulating properties of the panel. The solar control coating 7 may be provided on substrate 1 or substrate 2. A passivation layer (not shown) may be provided on the substrate on which the low-E coating 7 is not provided, such as on substrate 1 for example between the glass substrate and the spacers 4. For example, in FIG. 1, the low-E coating is provided on substrate 2 whereas the passivation layer may be provided on substrate 1.

Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear, low iron, or otherwise tinted/colored such as green, grey, bronze, or blue tinted. Substrates 1 and 2, in certain example embodiments, may each have a visible transmission of at least about 40%, more preferably of at least about 50%, possibly at least about 90%, with an example visible transmission being from about 50-95% or from about 60-95%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 2-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) may be heat strengthened. As known in the art, thermal tempering of glass typically involves heating the glass to a temperature of at least 585 degrees C., more preferably to at least 600 degrees C., more preferably to at least 620 degrees C. (e.g., to a temperature of from about 620-650 degrees C.), and then rapidly cooling the heated glass so as to compress surface regions of the glass to make it stronger. The glass substrates may be thermally tempered to increase compressive surface stress and/or central tension stress, and to impart safety glass properties including small fragmentation upon breakage. When tempered or heat strengthened glass substrates 1 and/or 2 are used, the substrate(s) may be tempered (e.g., thermally or chemically tempered) or heat strengthened prior to firing/sintering of main edge seal material 30 (e.g., via laser) to form the edge seal 3. When a vacuum insulated glass panel/unit has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

In various example embodiments, vacuum insulating panel 100 may include at least one sorption getter 8 (e.g., at least one thin film getter) for helping to maintain the vacuum in low pressure space 5 by using reactive material for soaking up and/or bonding to gas molecules that remain in space 5 and/or which outgas from the glass substrate(s), thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

A vacuum insulating panel 100 may also include a pump-out tube 12 used for evacuating the space 5 to a pressure(s) less than atmospheric pressure, where the elongated pump-out tube 12 may be closed/sealed after evacuation of the space 5. Pump-out seal 13 may be provided around tube 12, and a cap 14 may be provided over the top of the tube 12 after it is sealed. Tube 12 may extend part way through the substrate 1, for example part way through a double countersink hole drilled in the substrate as shown in FIG. 1. However, tube 12 may extend all the way through the substrate 1 in alternative example embodiments. In certain example embodiments, the hole for the pump-out tube may extend all the way through substrate 1 (or substrate 2), and/or through the passivation layer and/or low-E coating. Pump-out tube 12 may be of any suitable material, such as glass, metal, ceramic, or the like. In certain example embodiments, the pump-out tube 12 may be located on the side of the vacuum insulating panel 100 configured to face the interior of the building when the panel is used in a commercial and/or residential window. In certain example embodiments, the pump-out tube 12 may instead be located on the side of the vacuum insulating panel 100 configured to face the exterior of the building. The pump-out tube 12 may be provided in an aperture defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate material or to a primer layer applied to the glass substrate surface prior to the pump-out seal material being applied to the substrate, in certain example embodiments. After evacuation of space 5, the tip of the tube 15 may be melted via laser to seal same, and hermetic sealing of the space 5 in the panel 100 can be provided both by the edge seal 3 and by the sealed upper portion of the pump-out tube 12 together with seal 13 and/or cap 14. In certain example embodiments, the elongated pump-out tube 12 may be substantially perpendicular (perpendicular plus/minus ten degrees, more preferably plus/minus five degrees) to the substrates 1 and 2. Any of the elements/components shown in FIGS. 1-2 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/sealed, the gap 5 between at least the substrates 1 and 2 may be at a pressure no greater than about $1.0 \times 10^{-2}$ Torr, more preferably no greater than about $1.0 \times 10^{-3}$ Torr, more preferably no greater than about $1.0 \times 10^{-4}$ Torr, and for example may be evacuated to a pressure no greater than about $1.0 \times 10^{-6}$ Torr. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

In certain example embodiments, substantially transparent ceramic spacers 4 may be of or include aluminosilicate glass such as lithia aluminosilicate glass, or any other suitable ceramic material. Ceramic spacers 4 may be chemically strengthened, e.g., via ion exchange(s) process(es), in certain example embodiments so as to provide for compressive and tension stress regions in order to improve compressive strength of the spacers. In certain example embodiments, spacers 4 may be configured to have a Mohs hardness close to that of substrates 1, 2 of the panel 100, such as a Mohs hardness of from about 4.5 to 6.5, more preferably from about 5.0 to 6.0, to reduce hertzian cracks and/or other substrate cracking. In certain example embodiments, spacers 4 may be substantially transparent to visible light, such as at least about 50%, more preferably at least about 60%, more preferably at least about 70%, transmissive of visible light, so as to provide for an aesthetically pleasing panel 100. In certain example embodiments, spacers 4 may have a refractive index (n), at 550 nm, of from about 1.40 to 1.65, more preferably from about 1.45 to 1.55, to reduce visibility and/or reflectance and improve aesthetics of the panel 100. In certain example embodiments, spacers 4 may each have an extinction coefficient (k), at 550 nm, of no greater than about 0.020, more preferably no greater than about 0.010, to reduce visibility and improve aesthetics of the panel 100. In certain example embodiments, spacers 4 may have a Youngs Modulus of about from 65 GPa to about 88 GPa and Shear Modulus from about 20 GPa to about 40 GPa.

Figure 4:
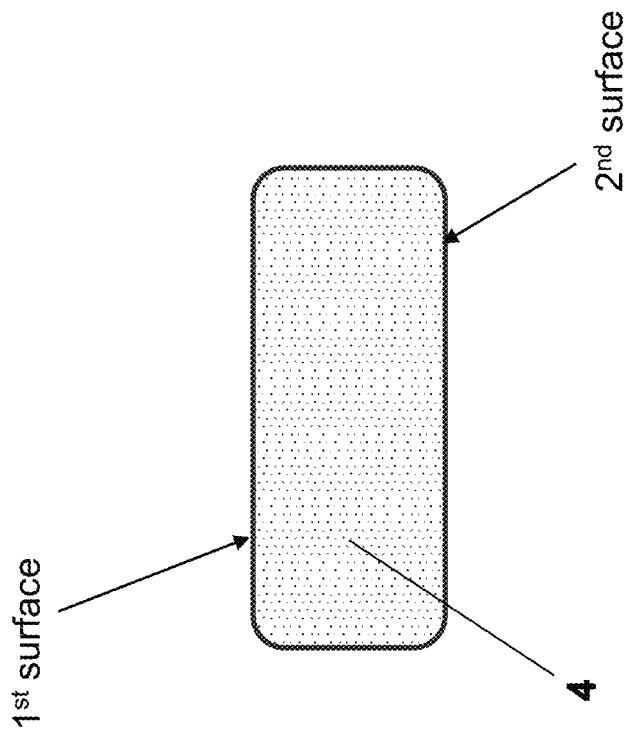
FIG. 4 is a side view of an example spacer of FIGS. 1-3.
Figure 3:
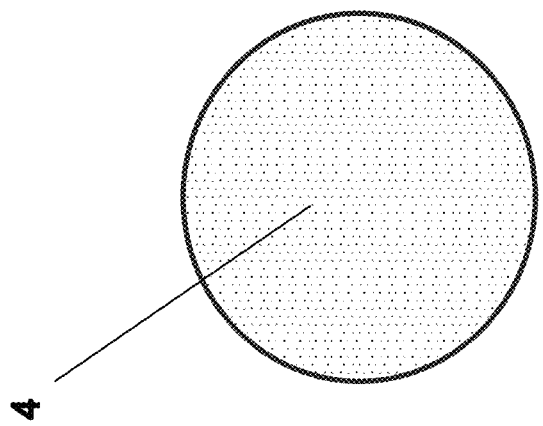
FIG. 3 is a top view of an example spacer that may be used in the embodiment(s) of FIGS. 1-2.

FIG. 3 is a top view of an example spacer 4 that may be used in the embodiment(s) of FIGS. 1-2. And FIG. 4 is a side view of an example spacer 4 of FIGS. 1-3. As with all figures and descriptions herein, this description may apply to all spacers 4 in the panel 100, just some of the spacers 4 in the panel 100, or to a single spacer 4 in the panel 100. FIGS. 3-4 illustrate that the spacers 4 may be disc-shaped and/or puck-shaped in certain example embodiments. In FIGS. 1 and 4 for example, it can be seen that in certain example embodiments spacers 4 have and upper surface (e.g., see $1^{st}$ surface) and a lower surface (e.g., see $2^{nd}$ surface) that are substantially parallel (parallel plus/minus about ten degrees) to each other. In certain example embodiments, such as when the spacers 4 are disc-shaped and/or puck-shaped, at least one of the spacers 4 may be configured so that the spacer diameter or width may be at least about 1.8 times larger than a height of the spacer, to allow the spacer(s) to more easily be placed onto the substrate during manufacturing. However, spacers 4 may take any suitable shape (e.g., round, oval, disc-shaped, puck-shaped, square, rectangular, rod-shaped, etc.) in various example embodiments.

Figure 5:
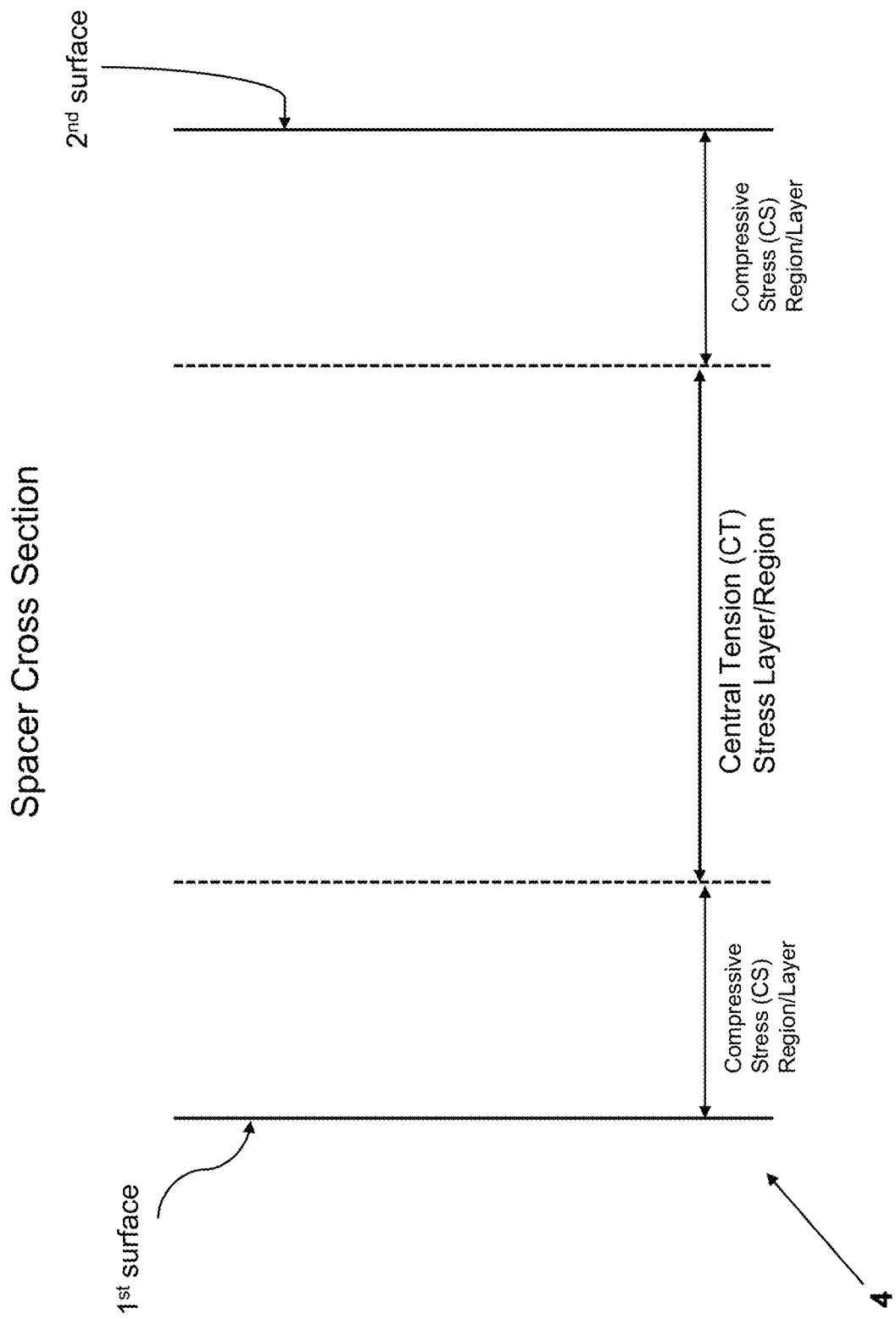
FIG. 5 is a side cross-sectional view of an example spacer of FIGS. 1-4, with the spacer being turned on its side in this figure relative to its position in FIGS. 1 and 4; this spacer may be used for any spacer according to any embodiment herein.

FIG. 5 is a side cross-sectional view of an example chemically strengthened ceramic spacer 4 of FIGS. 1-4, with the spacer being turned on its side in this figure relative to its position in FIGS. 1 and 4. This spacer may be used for any spacer according to any embodiment herein. As with all figures and descriptions herein, this figure and description may apply to all spacers 4 in the panel, just some of the spacers 4 in the panel, or to a single spacer 4 in the panel. The spacer 4 in FIG. 5 has been chemically strengthened, via an ion exchange process, so as to form two compressive stress (CS) regions and a tension stress region (e.g., central tension stress region, CT) in the spacer 4, in order to improve strength thereof. FIG. 5 illustrates that the CS regions are at the left and right portions of the spacer as shown in FIG. 5, indicating that the CS regions are at the top and bottom portions of the spacer 4 as shown in FIGS. 1 and 4. FIG. 5 illustrates that the tensile stress region CT is sandwiched between the two compressive stress regions CS, when the spacer 4 is viewed cross-sectionally. The "$1^{st}$ surface" labeled in the figure is the surface facing substrate 1, whereas the "$2^{nd}$ surface" labeled in the figure is the surface facing the other substrate 2, as shown in FIGS. 1 and 4 for example. The compressive stress regions CS, and the tensile stress region CT, may be formed by chemical strengthening processing, such as via ion exchange(s) processing, in certain example embodiments.

Figure 6:
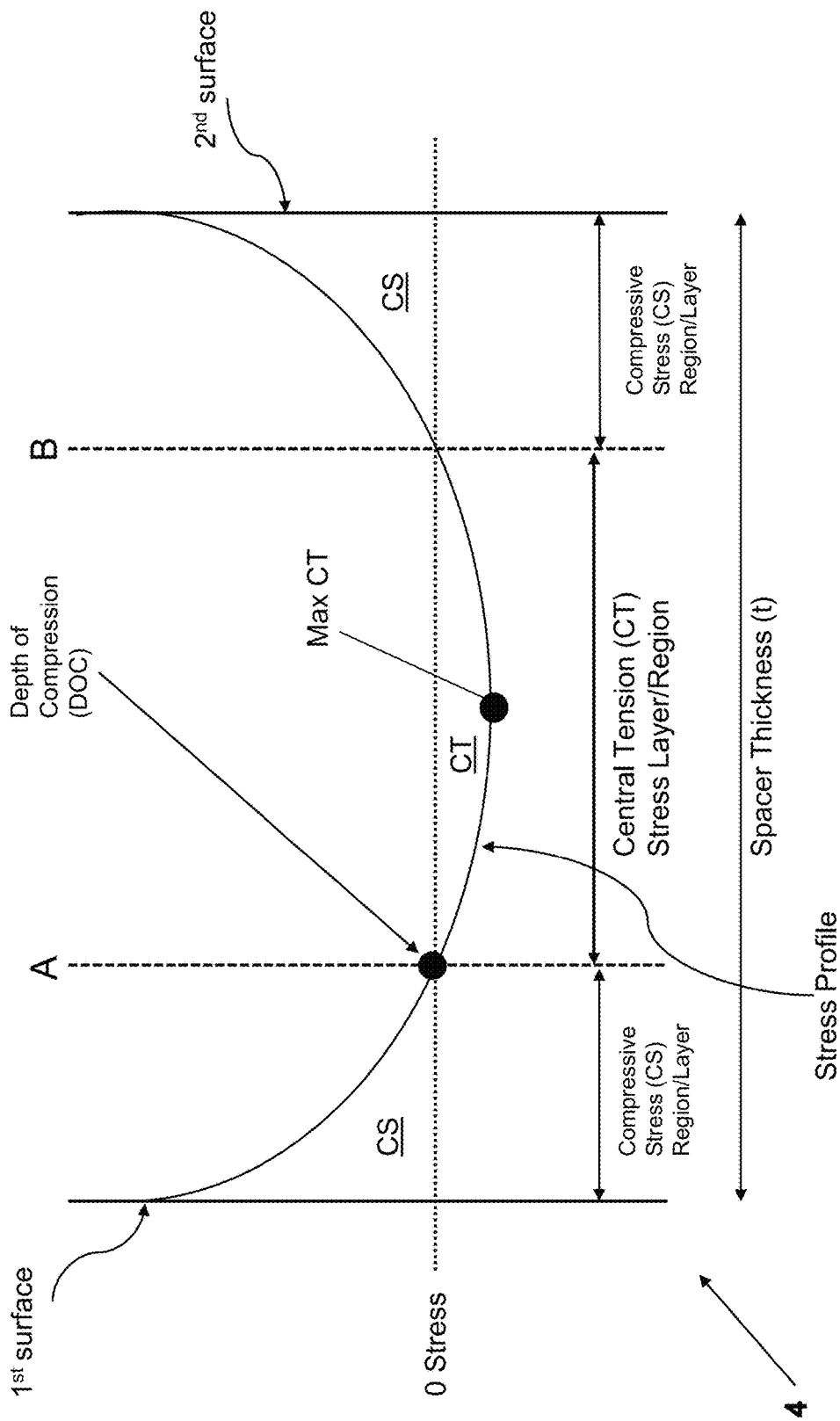
FIG. 6 is a side cross-sectional view of an example spacer of FIGS. 1-5 illustrating a stress profile of the spacer according to an example single ion exchange chemically strengthened embodiment, with the spacer being turned on its side in this figure relative to its position in FIGS. 1 and 4; this spacer may be used for any spacer according to any embodiment herein.

FIG. 6 is a side cross-sectional view of an example chemically strengthened ceramic spacer 4 of FIGS. 1-5, with the spacer being turned on its side in this figure relative to its position in FIGS. 1 and 4. FIG. 6 is similar to FIG. 5, except that a stress profile curve has been added in FIG. 6 to illustrate the relative magnitudes of compressive and tensile stress in various regions after chemical strengthening via a single ion exchange process. The FIG. 6 graph, moving from left-to-right in the figure, is moving from the top surface (e.g., $1^{st}$ surface) of the spacer to the bottom surface (e.g., $2^{nd}$ surface) of the spacer through the thickness "t" of the spacer 4. This spacer 4 may be used for any spacer according to any embodiment herein. As with all figures and descriptions herein, this figure and description may apply to all spacers 4 in the panel, just some of the spacers 4 in the panel, or to a single spacer 4 in the panel. The spacer 4 in FIG. 6 has been chemically strengthened, via a single ion exchange process, so as to form two compressive stress regions CS and a tension stress region CT in the spacer 4, in order to improve strength thereof.

FIG. 6 illustrates that the CS regions are at the left and right portions of the spacer as shown in FIG. 5, indicating that the CS regions are at the top and bottom portions of the spacer 4 as shown in FIGS. 1 and 4. FIG. 6 also illustrates that the tensile stress region CT is sandwiched between the two compressive stress regions CS, when the spacer 4 is viewed cross-sectionally. Each of the two compressive stress regions CS in FIG. 6 is bounded by the "stress profile" curve, the 0 stress horizontal axis, and the corresponding surface ($1^{st}$ or $2^{nd}$) of the spacer 4. As can be seen in FIG. 6, the highest compressive stress in each CS region is adjacent the surface of the spacer ($1^{st}$ or $2^{nd}$ surface), and the lowest compressive stress in each CS region is adjacent the "0 stress" axis. The "0 stress" axis represents the transition area in the body of the spacer 4, above where compressive stress ends and tensile stress begins. FIG. 6 also illustrates that the lowest tensile stress in the tension stress region CT is adjacent the 0 stress axis, whereas the maximum tensile stress in the tension stress region is proximate the center of the spacer 4 moving through its thickness "t." The tensile stress region CT is bounded by the 0 stress axis and the trough of the "stress profile" curve. Vertical dotted lines A and B in the figure represent respective interfaces between the tensile stress region CT and the compressive stress regions CS, where the stress transitions from one to the other moving through the thickness of the spacer. The "stress profile" curve in FIG. 6 may be generally smooth in shape, given that a single ion exchange process was used in this example embodiment.

Figure 7:
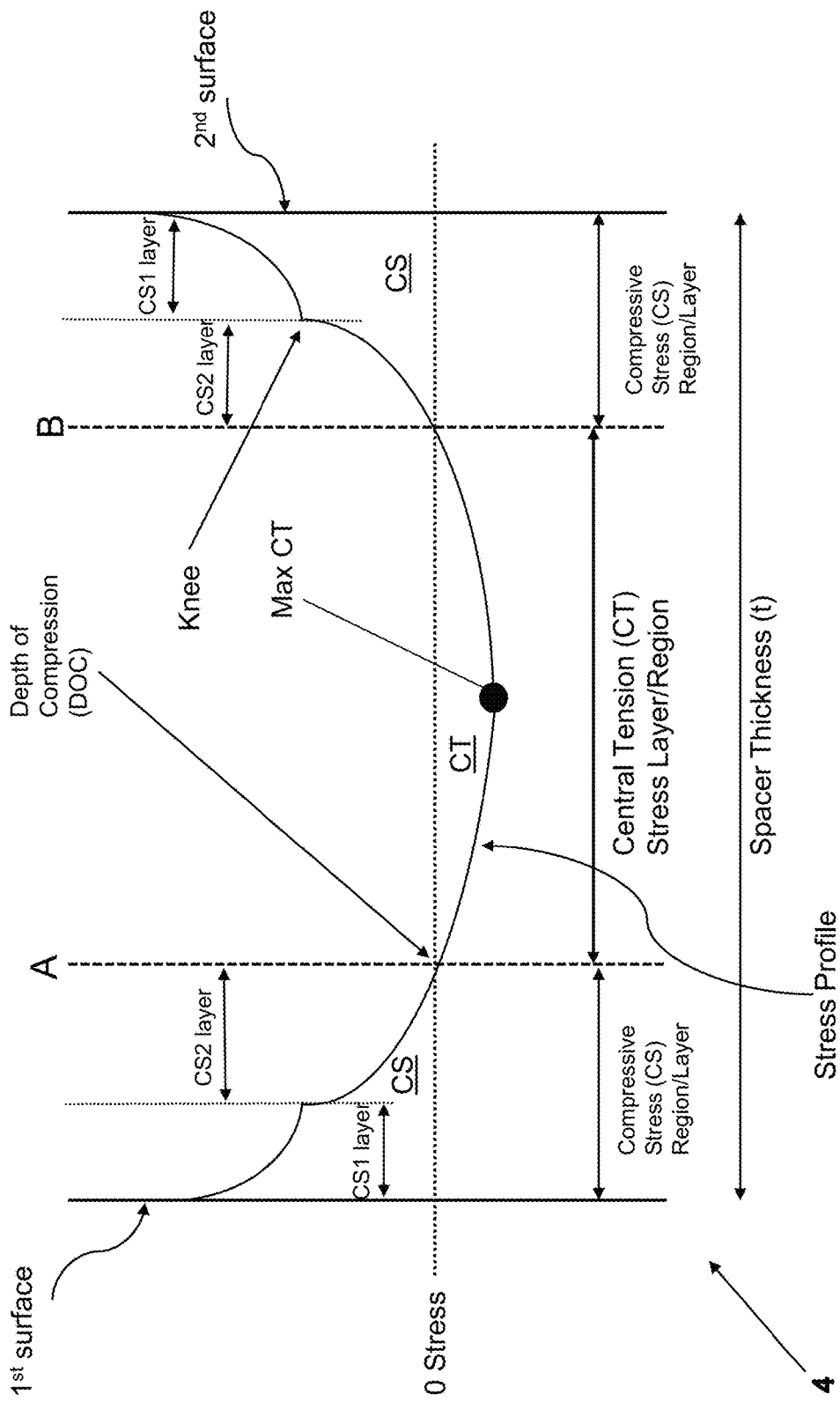
FIG. 7 is a side cross-sectional view of an example spacer of FIGS. 1-5 illustrating a stress profile of the spacer according to an example double ion exchange chemically strengthened embodiment, with the spacer being turned on its side in this figure relative to its position in FIGS. 1 and 4; this spacer may be used for any spacer according to any embodiment herein.

FIG. 7 is a side cross-sectional view of an example chemically strengthened ceramic spacer 4 of FIGS. 1-5, with the spacer being turned on its side in this figure relative to its position in FIGS. 1 and 4. FIG. 7 is similar to FIGS. 5-6, except that a stress profile curve is provided in FIG. 7 to illustrate the relative magnitudes of compressive and tensile stress in various regions after chemical strengthening via a double ion exchange process. Thus, two ion exchange processes were used in the FIG. 7 embodiment, whereas just one was used in the FIG. 6 embodiment. The FIG. 7 graph, moving from left-to-right in the figure, is moving from the top surface (e.g., $1^{st}$ surface) of the spacer to the bottom surface (e.g., $2^{nd}$ surface) of the spacer through the thickness "t" of the spacer 4. This spacer 4 may be used for any spacer according to any embodiment herein. As with all figures and descriptions herein, this figure and description may apply to all spacers 4 in the panel, just some of the spacers 4 in the panel, or to a single spacer 4 in the panel. The two ion exchange processes used for FIG. 7 formed the two compressive stress regions CS and a tension stress region CT in the spacer 4. Each CS region in FIG. 7 includes at least two different compressive stress layers CS1 and CS2 which interface at a "knee", as shown in the figure, resulting from the two ion exchange processes respectively. As with FIG. 6, each of the two compressive stress regions CS in FIG. 7 is bounded by the "stress profile" curve, the 0 stress horizontal axis, and the corresponding adjacent surface ($1^{st}$ or $2^{nd}$) of the spacer 4. As can be seen in FIG. 7, the highest compressive stress in each CS region is adjacent the surface of the spacer ($1^{st}$ or $2^{nd}$ surface), and the lowest compressive stress in each CS region is adjacent the "0 stress" axis. Like FIG. 6, FIG. 7 also illustrates that the lowest tensile stress in the tension stress region CT is adjacent the 0 stress axis, whereas the maximum tensile stress (max CT) in the tension stress region CT is proximate the center of the spacer 4 moving through its thickness "t" which is proximate the bottom of the stress profile curve. The tensile stress region CT is bounded by the 0 stress axis and the trough of the "stress profile" curve. "Knee" portion is provided between the "stress profile" curve portions for respective compressive stress layers CS1 and CS2 in FIG. 7, due to the first and second ion exchange processes that were used in this example embodiment.

Figure 8:
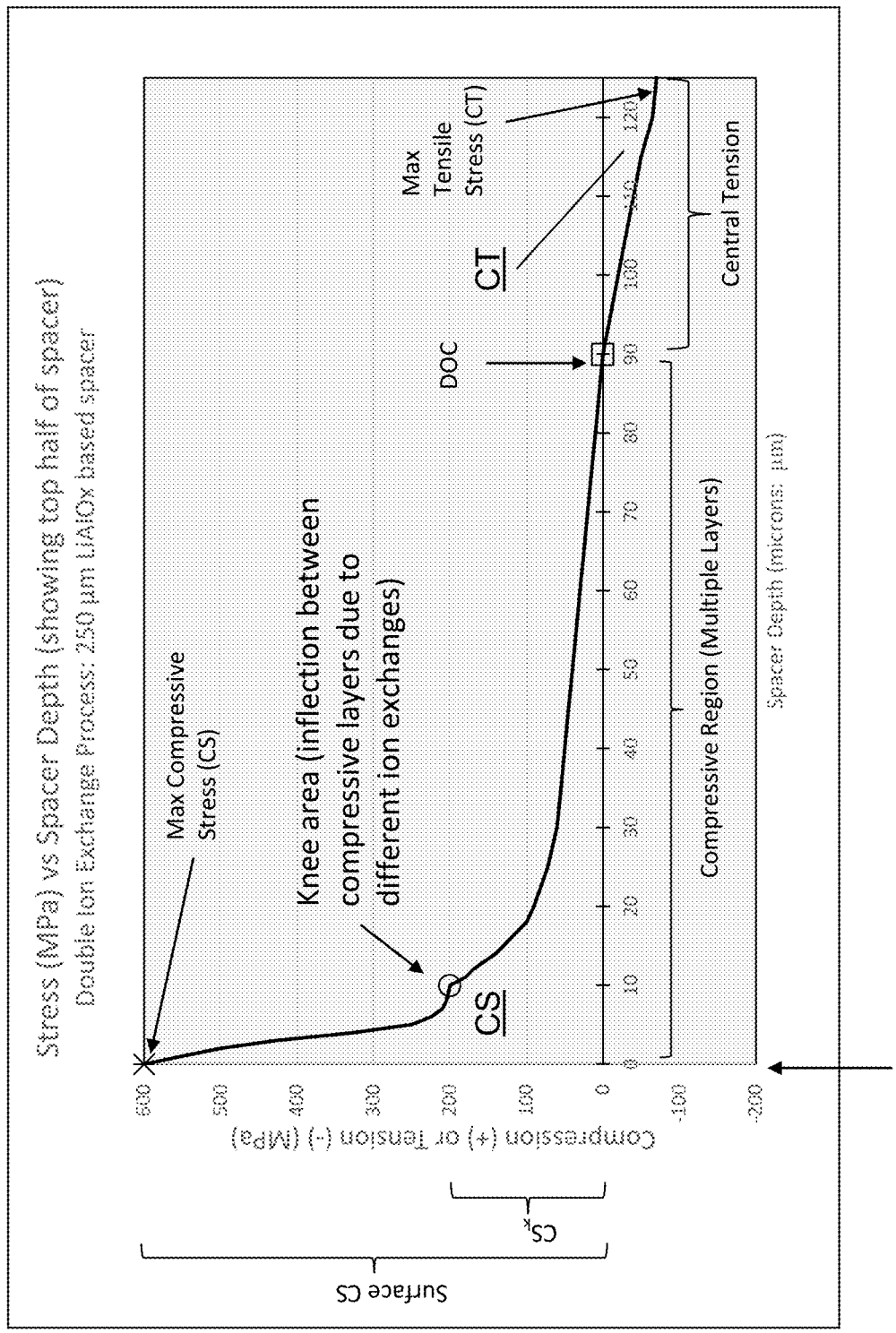
FIG. 8 is a side spacer depth (μm) vs. stress magnitude graph for an example spacer of any of FIG. 1-5 or 7, illustrating compressive and tensile stress magnitudes, according to an example double ion exchange chemically strengthened embodiment; this spacer may be used for any spacer according to any embodiment herein.

FIG. 8 is a side spacer depth (μm) vs. stress magnitude graph for an example spacer(s) 4 of any of FIG. 1-5 or 7, illustrating compressive and tensile stress magnitudes, according to an example double ion exchange chemically strengthened embodiment. This spacer may be used for any spacer according to any embodiment herein. The graph of FIG. 8, for example, is applicable to the double ion exchange cross-sectional drawing in FIG. 7. The graph of FIG. 8 illustrates the top half of the spacer 4. The horizontal axis in FIG. 8 represents distance (μm) moving downward into the spacer 4 from the top surface (1$^{st}$ surface) thereof, and the vertical axis represents stress magnitude where compressive stress magnitude in the upper compressive stress region CS is positive (above the 0 line) and tensile stress in the central region CT of the spacer is negative (below the 0 line). For example, FIG. 8 illustrates that compressive stress proximate the upper/top surface (1$^{st}$ surface) of the spacer 4 was about 600 MPa, and that compressive stress at a depth of about 10 µm into the spacer 4 at the knee was about 200 MPa. $CS_k$ in FIG. 8 represents the location of the knee (e.g., interface between the first and second CS layers), which is about 10 µm into the spacer from the top thereof and was at an area of about 200 MPa of compressive stress, in this example embodiment. Thus, compressive stress in the area between the knee and the upper surface of the spacer was from about 200 to 600 MPa in this example embodiment, which is based on example data. Compressive stress dropped from about 200 MPa at the knee area about 10 µm into the spacer, down to about 0 around 90 µm into the spacer 4 where the stress transitioned from the compressive stress region CS to the central tension tensile stress region CT. The depth of compression (DOC) was about 90 µm into the spacer, measured from the top of the spacer 4, in this example embodiment. FIG. 8 illustrates that, in the tension stress region CT, the maximum tensile stress was about 70 or 80 MPa at about 125 µm into the spacer which is about halfway through the 250 µm thick spacer 4.

Figure 9:
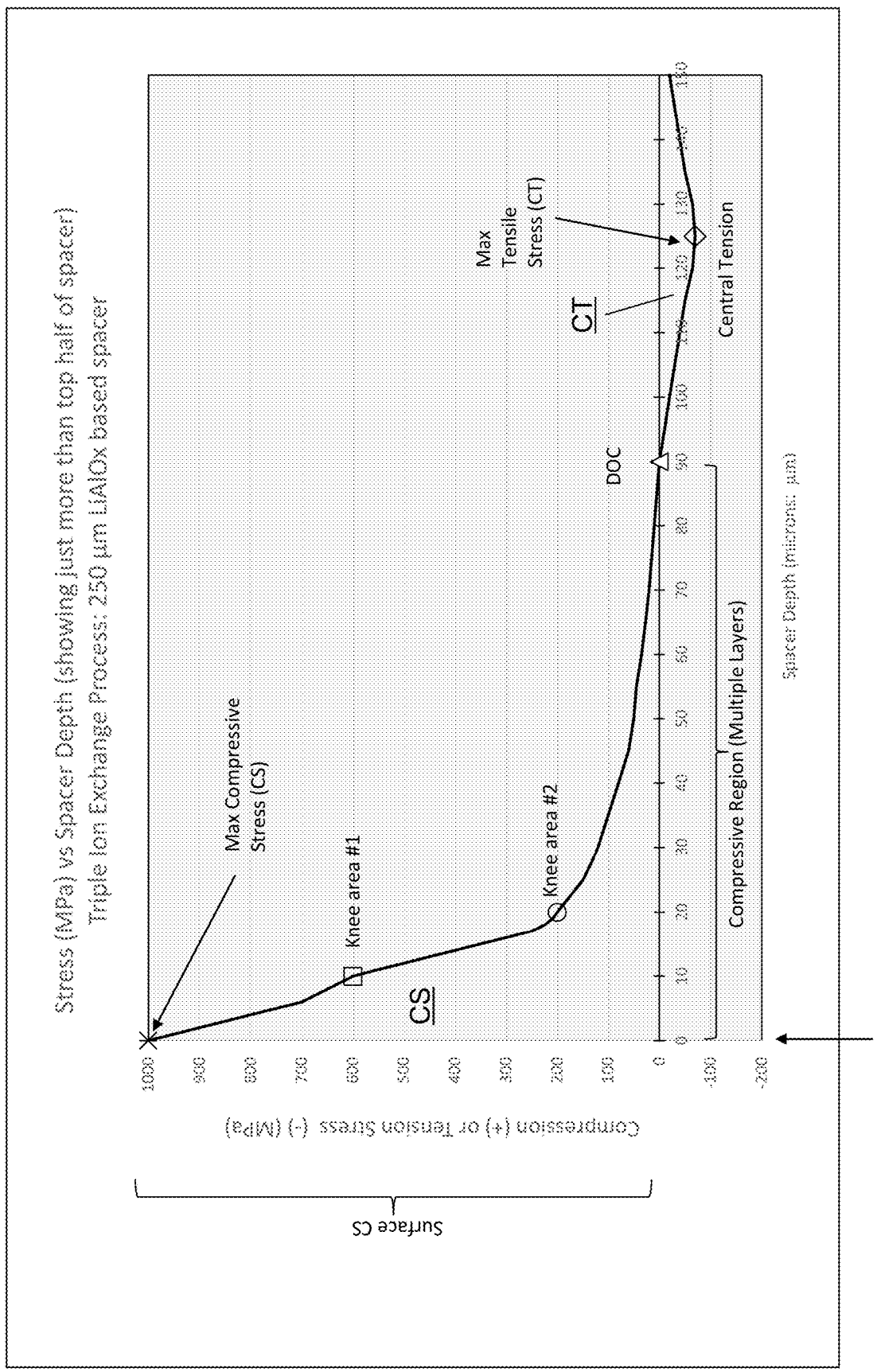
FIG. 9 is a side spacer depth (µm) vs. stress magnitude graph for an example spacer of any of FIG. 1-5 or 7, illustrating compressive and tensile stress magnitudes, according to an example triple ion exchange chemically strengthened embodiment; this spacer may be used for any spacer according to any embodiment herein.

FIG. 9 is a side spacer depth (µm) vs. stress magnitude graph for an example spacer of any of FIGS. 1-5, illustrating compressive and tensile stress magnitudes, according to an example triple ion exchange chemically strengthened embodiment. FIG. 9 is similar to FIG. 8, except that a triple ion exchange process was used to obtain the data for this example embodiment. This spacer may be used for any spacer according to any embodiment herein. The graph of FIG. 9 illustrates just a bit more than the top half of the spacer 4. The horizontal axis in FIG. 9 represents distance (µm) moving downward into the spacer 4 from the top surface (1$^{st}$ surface) thereof, and the vertical axis represents stress magnitude where compressive stress magnitude in the upper compressive stress region CS is positive (above the 0 line) and tensile stress in the central region CT of the spacer is negative (below the 0 line). For example, FIG. 9 illustrates that compressive stress proximate the upper/top surface (1$^{st}$ surface) of the spacer 4 was about 1,000 MPa, and that compressive stress at a depth of about 10 µm into the spacer 4 at the first knee was about 600 MPa, and that compressive stress at a depth of about 20 µm into the spacer 4 at the second knee was about 200 MPa. Thus, compressive stress in the area between the first knee and the upper surface of the spacer was from about 600 to 1,000 MPa in this example embodiment, and compressive stress in the area between the two knees was from about 200 to 600 MPa in this example embodiment, which is based on example data. Compressive stress dropped from about 200 MPa at the second knee area about 20 µm into the spacer, down to about 0 around 90 µm into the spacer 4 where the stress transitioned from the compressive stress region CS to the central tension tensile stress region CT. The depth of compression (DOC) was about 90 µm into the spacer, measured from the top of the spacer 4, in this example embodiment. FIG. 9 illustrates that, in the tension stress region CT, the maximum tensile stress was about 70 or 80 MPa at about 125 µm into the spacer which is about halfway through the 250 µm thick spacer 4. In FIGS. 8-9, the upper compressive stress region CS is bounded by the top surface (1$^{st}$ surface) of the spacer, the stress profile curve, and the 0 stress magnitude line; and the tension stress region CT is bounded by the 0 stress magnitude line and the stress profile curve below the 0 stress magnitude line.

In certain example embodiments, for one or more of the spacers 4, based on FIGS. 5-9 for example, the spacer comprises a pair of compressive stress regions CS which sandwich therebetween a tension stress region CT, due to chemical strengthening processing such as ion exchange processing. In certain example embodiments, compressive stress in at least part of at least one of the compressive stress region CS is at least about 400 MPa, more preferably at least about 500 MPa, more preferably at least about 600 MPa, more preferably at least about 700 MPa, more preferably at least about 800 MPa, and possibly at least about 900 MPa (e.g., see FIGS. 8-9). In certain example embodiments, compressive stress in at least part of at least one of the compressive stress region CS may be at least partly in a range of from about 400-1300 MPa, more preferably from about 500-1300 MPa, and most preferably from about 600-1200 MPa, with an example being at least partially being in a range of from about 500-1,000 MPa. In certain example embodiments, at a location adjacent the upper and/or bottom surface (1$^{st}$ surface and/or 2$^{nd}$ surface) of the spacer 4, compressive stress may be at least about 400 MPa, more preferably at least about 500 MPa, more preferably at least about 600 MPa, and possibly at least about 700 MPa (e.g., see FIGS. 8-9). In certain example embodiments, at a location about 10 µm into the spacer 4 from the adjacent upper and/or bottom surface (10 µm from the 1$^{st}$ surface and/or 2$^{nd}$ surface), compressive stress may be at least about 150 MPa, more preferably at least about 175 MPa, more preferably at least about 200 MPa, more preferably at least about 300 MPa, and even more preferably at least about 400 MPa or at least about 500 MPa (e.g., see FIGS. 8-9). In certain example embodiments, tensile stress in at least part of the tension stress region is at least about 25 MPa, more preferably at least about 40 MPa, more preferably at least about 50 MPa, and most preferably at least about 60 MPa, or at least about 70 MPa. In certain example embodiments, tensile stress in at least part of the tension stress region may be from about 40-90 MPa or from about 40-80 MPa. In certain example embodiments, spacer(s) may have a depth of compression (DOC) of from about 50-120 µm, more preferably from about 70-110 µm, more preferably from about 80-100 µm.

An array of such spacers 4 may be provided in the low pressure space 5 of the vacuum insulating panel 100. The spacing or separation of the spacers within the array can vary from about 10 mm to 100 mm depending on the strength of the spacers and ability to maintain the vacuum gap and physical separation of the two glass substrates 1 and 2 without significantly damaging the glass substrate surfaces. An example spacer 4, in certain example embodiments, is capable of supporting a spacer array spacing of at least about 40 mm with ceramic (e.g., glass) spacers 4 strengthened using single ion exchange strengthening processes and at least about 50 mm with ceramic (e.g., glass) spacers 4 strengthened using double ion exchange strengthening processes. An example spacer array spacing may be from about 60 mm to about 80 mm to reduce the thermal conduction transmitted through the spacer devices placed between the two glass substrates.

In certain example embodiments, spacer(s) 4 may be disc-shaped device with a diameter of at least about 0.4 mm with a thickness of at least about 0.25 mm. In other example embodiments, the spacers may take different shapes. For example, the spacers 4 may be spherical, cylindrical, square, rectangular, rod-like, bead-like, oval, trapezoidal, or the like. In certain example embodiments, the spacer diameter or width may be from about 0.20 mm to 1.0 mm and the spacer height may be from about 0.10 mm to 0.5 mm. The spacer edges may be rounded or eased to reduce cracking in the opposing glass substrates of the vacuum insulating unit during spacer movement. In certain example embodiments, all spacers 4 may be of approximately the same size and/or material. However, in other embodiments, there may be different sizes and/or materials for different spacers in the same vacuum insulating panel.

In certain example embodiments, the density of spacers 4 (the number of spacers per unit area) may be greater in certain areas than in other areas, or alternatively, the density of the spacers may be approximately uniform throughout the entire panel. The first row or column of spacers 4 may be placed at different distances from the hermetic perimeter edge seal 3 depending on the physical dimensions of the vacuum insulating unit and the strength of the spacers. Spacers 4 chemically strengthen via a double ion exchange process may be capable for further spacing that spacers chemically strengthen via a single ion exchange process, in certain example embodiments. An example first row or column spacer spacing from the edge of the hermetic perimeter seal 3 may be at least about 40 mm in certain example embodiments to reduce the thermal conduction transmitted through the spacer devices placed between the two glass substrates.

In various example embodiments, the spacers 4 may be visibly unobtrusive and aesthetically pleasing due to being substantially transparent to visible light and/or having a refractive index close to that of glass. Their translucent properties, similar to soda lime silicate glass which may be used for the substrates 1 and/or 2, allows the spectral transmission of a large portion of visible wavelengths of light compared to opaque metal spacers, for example. Background illumination conditions, both day and night, may thus alter the tint of spacers 4 to a shade or tint more closely matched to the background itself (e.g., the background is the area behind a vacuum insulating panel, which a viewer is looking through) so that the spacers 4 may blend into the surrounding environment more easily than highly opaque spacers. For example, in certain example embodiments, spacers 4 may have an index of refraction (n) of from about 1.50 (or from about 1.45 to 1.55, or from about 1.50 to 1.55) which closely approximates the index of refraction of soda lime silicate glass which may be used for at least one of the substrates 1 and/or 2. In certain example embodiments, chemically strengthened spacers 4 may have low absorption properties due to low iron and/or iron oxide content in the chemically strengthened spacers. In certain example embodiments, spacers 4 may have an extinction coefficient of no greater than about 0.010 which may help the spacers to be translucent in the visible light spectrum.

In an example embodiment, spacers 4 may be of or include an amorphous glass material comprising the following elements with approximately the following weight percentages: $SiO_2$—62.132%; $Al_2O_3$—32.340%; $P_2O_5$—4.780%; ZnO—0.650%; $K_2O$—0.025%; $Fe_2O_3$—0.021%; CaO—0.014%; SnO2—0.013%; and trace amounts of $LiO_2$; $ZrO_2$; $Ga_2O_3$; MnO; CuO; and/or $Rb_2O$. In certain example embodiments the spacers 4 may be of or include a glass composition comprising the following elements in the following ranges in terms of weight percent: $SiO_2$—60.0 to 64.0%; $Al_2O_3$—29.0 to 36.0%; $P_2O_5$—3.0 to 6.0%; ZnO—0.0 to 2.0%; $K_2O$—0.0 to 1.0%; and $Fe_2O_3$—0.0 to 1.0%. Such example amorphous glass spacers may be considered aluminosilicate glass spacers, and may have a coefficient of thermal expansion (CTE) of from about 7.8 to $9.2 \times 10^{-6}$ per degree C.; a softening point of from about 750 degrees C. to 900 degrees C., glass transition temperature of from about 520 degrees C. to 650 degrees C., and/or an annealing point of from about 540 degrees C. to 670 degrees C. In certain example embodiments, such an example aluminosilicate spacer elemental composition may be optimized to closely match the coefficient of thermal expansion of the soda lime silicate based glass substrate(s).

In certain example embodiments, spacer 4 may be of or include an amorphous glass material comprising in terms of weight percentages: $SiO_2$—69.98%; $Li_2O$—7.87%; $Al_2O_3$—7.41%; MgO—7.12%; $Na_2O$—5.22%; $ZrO_2$—1.04%; $K_2O$—0.97%; CaO—0.250%; and $TiO_2$—0.13%. Example ranges for such spacers 4 include, in terms of weight percentage: $SiO_2$—66.0 to 72.0%; $Li_2O$—5.0 to 9.0%; $Al_2O_3$—5.0 to 10.0%; MgO—5.0 to 10.0%; $Na_2O$—3.0 to 7.0%; $ZrO_2$—0.0 to 3.0%; $K_2O$—0.0 to 4.0%; CaO—0.0 to 2.0%; and $TiO_2$—0.0 to 3.0%. Such example amorphous glass spacers 4 may be considered lithia aluminosilicate (LAS) glass spacers 4 and may have a coefficient of thermal expansion of from about 7.9 to $9.3 \times 10^{-6}$ per degree C., a softening point of from about 760 degrees C. to 900 degrees C., a glass transition temperature of from about 525 degrees C. to 650 degrees C., and an annealing point of from about 540 degrees C. to 650 degrees C. Lithia aluminosilicate based spacers 4 may be optimized to substantially match the coefficient of thermal expansion of the soda lime silicate which may be used for at least one of the glass substrates 1 and/or 2.

Chemical strengthening of spacers may comprise single ion exchange, double ion exchange, and/or triple ion exchange processing in various example embodiments. For example, a first ion exchange process may be configured so that Na can replace some of the Li in the glass, a subsequent second ion exchange process may be configured so that K can replace some of the Na in the glass, and a subsequent third ion exchange process may be considered so that Rb can replace at least some K in the glass. For example, in a dual ion exchange process, a depth of potassium penetration may be at least about 4 µm from an outer spacer surface, and a deeper depth of sodium penetration may be from about 40-80 µm from the outer spacer surface. These ion exchanges may be designed to take place in surface regions of the glass, proximate the top and bottom surfaces of the spacers, to induce stress. This is provided for purposes of example.

In certain example embodiments, chemical strengthening via at least two ion change processes is desirable, in that compressive stress of at least 600 MPa can be achieved (this is sometimes not possible with a single ion exchange process).

In certain example embodiments, ceramic (e.g., glass) spacers 4 may be first chemically strengthened using a salt bath ratio of about 55% to 70% potassium nitrate ($KNO_3$) and about 30% to 45% sodium nitrate ($NaNO_3$). The salt bath may be pre-heated to between 340 degrees C. and 440 degrees C., with an example temperature of about 400 degrees C. for about 5 minutes to about 30 minutes with an example salt bath exposure time of about 20 minutes. The salt bath temperature setpoint may be increased to from about 370 degrees C. to 450 degrees C., with an example setpoint temperature of about 410 degrees C., for from about 120 minutes to about 240 minutes, with an example exposure time of about 150 minutes. The spacer may then, for example, be chemically strengthened using a salt bath ratio of from about 90% to about 99% potassium nitrate ($KNO_3$) and from about 1% to 10% sodium nitrate ($NaNO_3$). The salt bath may be pre-heated to from about 320-420 degrees C. with an example temperature of about 375 degrees C., for from about 5 minutes to about 30 minutes with an example salt bath exposure time of about 20 minutes. The salt bath temperature may be increased to a setpoint between about 350 and 475 degrees C., with an example setpoint temperature of about 440 degrees C. for about 20-100 minutes, with an example exposure time of about 70 minutes. The salt bath(s) may incorporate processing acid in the range of from about 1.0% to about 7.0%, with an example concentration of about 3.5%. The processing acid may be added to the salt bath to improve the quality of the glass surface for uniform chemical strengthening for the first chemical strengthening process step in the dual ion exchange process. In certain example embodiments, such a dual ion exchange process may produce a glass spacer 4 with a compressive surface stress in the range of from about 600-1200 MPa, or from about 750-950 MPa, a depth of layer of from about about 6-10 µm, a DOC of from about 50-90 µm, or from about 60-80 µm, a central tension maximum stress of from about 40-100 MPa or from about 40-60 MPa, and compressive stress at a knee area of from about 50-250 MPa. This is an example dual ion exchange chemical strengthening process for spacers 4, but it is to be understood that spacers 4 can instead be chemically strengthened via other suitable processes.

In another example embodiment, the spacers may first be chemically strengthened using a salt bath ratio of from about 0% to 5% potassium nitrate ($KNO_3$) and about 95% to 100% sodium nitrate ($NaNO_3$). The salt bath temperature setpoint may be from about 370-430 degrees C., with an example setpoint temperature of about 410 degrees C., for from about 120-180 minutes with an example exposure time of about 150 minutes. The spacers may then be chemically strengthened using a salt bath ratio of from about 90-99% potassium nitrate ($KNO_3$) and from about 1-10% sodium nitrate ($NaNO_3$). The salt bath temperature setpoint may be from about 420-500 degrees C. with an example setpoint temperature of about 440 degrees C., for from about 40-80 minutes with an example exposure time of about 60 minutes. The salt bath may incorporate processing acid in the range of from about 1.0-7.0% with an example concentration of about 3.5%. The processing acid may be added to the salt bath to improve the quality of the glass surface for uniform chemical strengthening for the first chemical strengthening process step in the dual ion exchange process. In certain example embodiments, the dual ion exchange process may produce a glass spacer 4 with a compressive surface stress of from about 600-1200 MPa, or from about 700-1000 MPa, a depth of layer of about 4-15 µm, a DOC of from about 50-90 µm or from about 40-70 µm, a central tension maximum stress of from about 40-100 MPa or from about 40-70 MPa, and compressive stress at a knee area of from about 70-250 MPa.

In another example embodiment, the spacers 4 may be first chemically strengthened using a salt bath ratio of from about 0% to 5% potassium nitrate ($KNO_3$) and from about 95% to 100% sodium nitrate ($NaNO_3$), with an example ratio of 0% $KNO_3$ and 100% $NaNO_3$. The salt bath may be pre-heated to between 360 degrees C. and 400 degrees C. with an example temperature of about 380 degrees C., for from about 40-80 minutes with an example salt bath exposure time of about 60 minutes. The salt bath temperature setpoint may then be increased to from about 390-420 degrees C., with an example setpoint temperature of about 410 degrees C., for from about 130-170 minutes with an example exposure time of about 150 minutes. The spacers may then be chemically strengthened using a salt bath ratio of from about 96-99% potassium nitrate ($KNO_3$) and from about 1-4% sodium nitrate ($NaNO_3$). The salt bath may be pre-heated to between 360 and 400 degrees C. with an example temperature of about 380 degrees C., for from about 40-80 minutes with an example salt bath exposure time of about 60 minutes. The salt bath temperature may then be increased to a setpoint between about 420 and 460 degrees C. with an example setpoint temperature of about 440 degrees C., for from about 60-100 minutes with an example exposure time of about 100 minutes. Another chemical treatment step may be added between the first ion exchange and the second ion exchange to improve the depth of compression and/or central tension maximum stress by extending the exposure time for the sodium ions replacing lithium ions in the spacer 4. The spacer may be chemically treated using a salt bath ratio of from about 6-18% potassium nitrate ($KNO_3$) and about 82-94% sodium nitrate ($NaNO_3$) with an example ratio of 10% $KNO_3$ and 90% $NaNO_3$. The salt bath may be pre-heated to between 360 and 440 degrees C. with an example temperature of about 400 degrees C., for about 2-10 minutes with an example salt bath exposure time of about 5 minutes. The salt bath temperature setpoint may be increased to about 380-460 degrees C. with an example setpoint temperature of about 440 degrees C., for about 60-200 minutes with an example exposure time of about 90 minutes. In certain example embodiments, this dual ion exchange process with an intermediate chemical treatment step may produce a spacer(s) with a compressive surface stress from about 600-1200 MPa or from about 700-750 MPa, a depth of layer of about 4-8 µm, a DOC of from about 50-90 µm or from about 50-80 µm, a central tension maximum stress of from about 40-100 MPa or from about 60-90 MPa.

In certain example embodiments, spacers 4 may be chemically in yet another manner. The spacers are first chemically strengthened using a salt bath ratio of about 0% to 5% potassium nitrate ($KNO_3$) and about 95% to 100% sodium nitrate ($NaNO_3$) with an example ratio of 0% $KNO_3$ and 100% $NaNO_3$. The salt bath may be pre-heated to between 360 and 400 degrees C. with an example temperature of about 380 degrees C., for about 40-80 minutes with an example salt bath exposure time of about 60 minutes. The salt bath temperature setpoint can then be increased to from about 390-420 degrees C. with an example setpoint temperature of about 410 degrees C., for about 130-170 minutes with an example exposure time of about 150 minutes. The spacer may then processed using a chemical treatment step to improve the depth of compression and central tension maximum stress by extending the exposure time for the sodium ions replacing lithium ions in the spacer. The spacer may then be chemically treated using a salt bath ratio of about 4% to about 16% potassium nitrate ($KNO_3$) and about 84% to about 96% sodium nitrate ($NaNO_3$) with an example ratio of 11% KNO; and 89% $NaNO_3$. The salt bath may be pre-heated to between 360 and 400 degrees C. with an example temperature of 380 degrees C., for about 2-10 minutes with an example salt bath exposure time of about 6 minutes. The salt bath temperature setpoint may be increased to about 380-480 degrees C. with an example setpoint temperature of about 400 degrees C., for about 2-10 minutes with an example exposure time of about 5 minutes. This ion exchange process with may produces a glass spacer with a compressive surface stress of at least about 400 MPa or from about 450-600 MPa, a depth of layer of about 5-15

μm, a depth of compression of about 50-70 μm, and/or a central tension maximum stress of from about 50-80 MPa.

In certain example embodiments, the spacers 4 may be chemically strengthened using a single ion exchange. For example, the spacers may be chemically strengthened using a salt bath ratio of about 55% to 70% potassium nitrate ($KNO_3$) and about 30% to 45% sodium nitrate ($NaNO_3$) with an example ratio of 60% $KNO_3$ and 40% $NaNO_3$. The salt bath may be pre-heated to between 330 and 400 degrees C. with an example temperature of about 370 degrees C., for about 10-20 minutes with an example salt bath exposure time of about 15 minutes. The salt bath temperature setpoint may be increased to about 360-440 degrees C., with an example setpoint temperature of about 410 degrees C., for about 100-200 minutes with an example exposure time of about 150 minutes. This, for example, may produce a glass spacer with a compressive surface stress of from about 450-650 MPa, a DOC of from about 70-110 μm, and/or a central tension maximum stress of from about 40-80 MPa.

In certain example embodiments, the spacers may be chemically strengthened using at least three salt baths thereby creating three distinct compressive stress zones in each CS region. For example, the three compressive stress zones may comprise a very high surface compressive stress zone providing high load strength for the vacuum insulated glass unit, a second intermediate stress zone that would improve the rupture performance of the spacer and a third zone of moderate stress to optimize the CS to CT ratio. The third zone could comprise a sodium nitrate salt bath, the second zone could comprise a potassium nitrate and sodium nitrate salt bath, and the first zone could comprise a potassium nitrate salt bath. In other example embodiments, the third zone could comprise a sodium nitrate salt bath, the second zone could comprise a potassium nitrate and sodium nitrate salt bath, and the first zone could comprise a rubidium nitrate salt bath. The three ion exchange process may provide the highest compressive surface stress, two knee areas to the stress profile, and optimize the CS to CT ratio (e.g., see FIG. 9). The three ion exchange steps may reduce the degree of plastic deformation of the spacer to less than about 2.0 or 4.0 μm at a spacer spacing of about 60 mm, and/or increase the rupture strength due to the thicker and/or more compressive compressive layer.

In certain example embodiments, a spacer disc-shape and sidewall profile may be modified prior to chemical strengthening to reduce chances of glass substrate damage during asymmetric thermal stress conditions, for example by rounding the edges of the disc via mechanical tumbling using metal oxide polishing or milling compounds or agents. The radii of curvature of the spacer sidewall may be optimized to reduce the occurrence of hertzian cracks in the glass substrates under 1E-7 pressure in certain example embodiments.

In certain example embodiments, a relationship between compressive surface stress (Css) and central tension stress (CT) may be approximated by the expressions: $CT=(Css \times DOL)/(t-(2\times DOL))$ or $CT=(cs \times DOL)/(t-(1.5 \times DOL))$, where t is the thickness, expressed in microns (μm), of the spacer 4. Central tension (CT) and compressive surface stress may be expressed in units of MPa, thickness t may be expressed μm, and depth of layer (DOL) may be expressed in μm. The relationship between compressive surface stress and CT may be used to optimize the spacer stress and plastic deformation so that the spacers have sufficient strength to support the mechanical force induced by the opposing substrates at pressures such as 1E-7 cavity pressure. In certain example embodiments, the surface compressive stress to CT ratio may be optimized by adjusting one or more of the ratio of sodium nitrate to potassium nitrate, salt bath temperature, salt bath immersion time and use of a pre-heat or pre-treatment step for ion exchange process step(s). The ratio of potassium nitrate to sodium nitrate may impact the rupture strength of the glass spacers 4.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, tin oxide, zinc stannate, and/or the like. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two, whereas in other example embodiments the low-E coating 7 may be provided on the interior surface of the glass substrate to be closest to the building interior, which is considered surface three.

Edge seal 3, which may include one or more of ceramic layers 30-32, may be located proximate the periphery or edge of the vacuum insulated panel 100 as shown in FIGS. 1-2. Edge seal 3 may be a ceramic edge seal in certain example embodiments. Layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. In certain example embodiments, each primer layer 31 and 32 may be of a material having a coefficient of thermal expansion (CTE) that is between that of the main seal layer 30 and the closest glass substrate 1, 2. A primer(s) 31 and/or 32 may be omitted in certain example embodiments. In certain example embodiments, primer layers 31 and 32 may be of or include different material(s) compared to the main seal layer 30. In certain example embodiments, main seal layer 30 and primers 31 and 32 can be sintered/fired in different heating steps, in a manner which allows thermal tempering of the glass substrates 1 and 2 when sintering/heating the primers on the respective glass substrates, and which allows the main seal layer 30 to thereafter be sintered and bonded to the primers 31 and 32 without significantly de-tempering the glass substrates 1 and 2. This may advantageously result in more efficient processing, reduction in damage (e.g., micro-cracking, adhesive failure, cohesive failure, and/or significant de-tempering), and a more durable and longer lasting vacuum insulating panel with much of its temper strength retained allowing for example compliance with industry safety testing for bag impact and/or point impact fragmentation.

Example materials, dimensions, and characteristics of the edge seal 3, which may include one or more of layers 30-32, the getter 8, the pump-out tube and corresponding seal, and example manufacturing techniques for the panel 100, may be found in U.S. Provisional Application No. 63/540,729, filed Sep. 27, 2023, the disclosure of which is hereby incorporated herein by reference in its entirety.

The edge seal 3, in certain example embodiments, may be located at an edge-deleted area (e.g., where the solar control coating 7 and/or passivation layer has/have been removed) of the substrate as shown in FIG. 1, so as to reduce chances of corrosion and to allow the seal to directly contact the glass substrates. Thus, the edge seal 3 may be positioned so that it does not overlap the low-E coating 7 and/or passivation layer in certain example embodiments. The edge seal 3 may be located at the absolute edge of the panel 100, or may be spaced inwardly from the absolute edge of the panel 100 as shown in FIGS. 1-2, in different example embodiments. An outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

The low-E coating 7 may be edge deleted around the periphery of the entire unit so as to remove the low-e coating material from the coated glass substrate. The same applies to the passivation layer. The low-E coating 7 and/or passivation layer edge deletion width (edge of glass to edge of low-E coating 7), in certain example embodiments, in at least one area may be from about 0-100 mm, with examples being no greater than about 6 mm, no greater than about 10 mm, no greater than about 13 mm, no greater than about 25 mm, with an example being about 16 mm. In certain example embodiments, there may be a gap between the primer seal layers 31 and 32 and/or main layer 30, and the low-E coating 7 and/or passivation layer, of at least about 1.0 mm, and/or of at least about 0.5 mm, so that the low-E coating 7 and/or passivation layer is not contiguous with the main seal layer 30 and/or the primer seal layers 31 and 32.

In certain example embodiments, in the manufactured vacuum insulating panel 100, the main seal layer 30 of the edge seal 3 may have an average thickness of from about 30-180 μm, more preferably from about 30-120 μm, more preferably from about 40-100 μm, and most preferably from about 50-85 μm. In certain example embodiments, in the manufactured vacuum insulating panel 100, the primer layer 31 of the edge seal 3 may have an average thickness of from about 10-100 μm, more preferably from about 10-80 μm, more preferably from about 20-70 μm, and most preferably from about 20-55 μm, with an example primer layer 31 average thickness being about 45 μm. In certain example embodiments, in the manufactured vacuum insulating panel 100, the primer layer 32 (opposite the side from which the laser beam 40 is directed) of the edge seal 3 may have an average thickness of from about 80-240 μm, more preferably from about 100-220 μm, more preferably from about 120-200 μm, and most preferably from about 120-170 μm, with an example primer layer 32 average thickness being about 145 μm. In certain example embodiments, the thickness of the main seal layer 30 may be at least about 30 μm thinner (more preferably at least about 45 μm thinner) than the thickness of the primer seal layer 32, and may be at least about 10 μm thicker (more preferably at least about 20 μm, and more preferably at least about 30 μm thicker) than the thickness of the primer seal layer 31. In certain example embodiments, in the manufactured vacuum insulating panel 100, the overall average thickness of the edge seal 3 may be from about 150-330 μm, more preferably from about 200-310 μm, and most preferably from about 220-290 μm, with an example overall edge seal 3 average thickness being about 270 μm. In certain example embodiments, the respective thicknesses of each layer 30, 31, and 32 may be substantially the same (the same plus/minus 10%, more preferably plus/minus 5%) along the length of the edge seal 3 around the periphery of the entire panel 100.

U.S. Provisional Application No. 63/540,729, filed Sep. 27, 2023, discloses example material(s) that may be used for the main seal layer 30 in various example embodiments. However, other suitable materials (vanadium oxide based ceramic materials with little or no Te oxide, solder glass, or the like) may instead be used for seal layer 30 in various example embodiments. For example, main seal layer 30 may be of or include a ceramic tellurium (Te) oxide based main seal material in certain example embodiments, which may also include vanadium oxide. Table 1, for example, illustrates example ranges for various example elements and/or compounds for an example tellurium oxide-based material for main seal layer 30 according to various example embodiments, for both mol % and weight %, after firing/sintering thereof and thus after hermetic edge seal 3 formation. It will be appreciated that other materials may be used together, or in place of, those shown below, and that the example percentages may be different in alternate embodiments.

TABLE 1

| (example material for main seal layer 30 after laser firing/sintering) | | | | | | |
|---|---|---|---|---|---|---|
| | General (Mol %) | More Preferred (Mol %) | Most Preferred (Mol %) | General (Wt. %) | More Preferred (Wt. %) | Most Preferred (Wt. %) |
| Tellurium oxide (e.g., TeO$_3$ and/or other stoichiometry) | 20-60% or 40-90% | 38-70% | 50-60% | 20-80% | 40-70% | 50-65% |
| Vanadium oxide (e.g., VO$_2$ and/or other stoichiometry) | 5-45% or 5-58% | 8-30% or 5-37% | 20-25% | 10-50% | 12-40% | 25-30% |
| Aluminum oxide (e.g., Al$_2$O$_3$ and/or other stoichiometry) | 0-45% or 1-25% | 5-30% or 6-25% | 8-20% | 0-45% | 3-30% | 5-15% |

TABLE 1-continued (example material for main seal layer 30 after laser firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Silicon oxide (e.g., SiO$_2$ and/or other stoichiometry) | 0-50% or 0-5% | 3-30% | 5-20% | 0-50% | 1-25% | 1-10% |
| Magnesium oxide (e.g., MgO and/or other stoichiometry) | 0-50% or 0-10% | 0.1-20% | 0.5-5% | 0-50% | 0.1-12% | 0.2-5% |
| Barium oxide (e.g., BaO and/or other stoichiometry) | 0-20% | 0-10% | 0-5% | 0-20% | 0-10% | 0-5% |
| Manganese oxide (e.g., MnO and/or other stoichiometry) | 0-20% | 0-10% | 0.50-5% | 0-20% | 0-10% | 0.50-5% |

In certain example embodiments, the material for the main seal layer 30 may include filler. The amount of filler may, for example, be from 1-25 wt. % and may have an average grain size (d50) of 5-30 µm, for example an average d50 grain size from about 5-20 µm, more preferably from about 5-15 µm, and most preferably less than about 10 µm. Mixtures of two or more grain size distributions (e.g., coarse: d50=15-25 µm and fine: d50=1-10 µm) may be used. The filler may, for example, comprise one or more of zirconyl phosphates, dizirconium diorthophosphates, zirconium tungstates, zirconium vanadates, aluminum phosphate, cordierite, eucryptite, ekanite, alkaline earth zirconium phosphates such as (Mg,Ca,Ba,Sr) Zr$_4$P$_5$O$_{24}$, either alone or in combination. Filler in a range of 20-25 wt. % may be used in layer 30 in certain example embodiments. Main seal layer 30, and/or the primer layer(s) 31 and/or 32, is/are lead-free and/or substantially lead-free in certain example embodiments.

U.S. Provisional Application No. 63/540,729, filed Sep. 27, 2023, discloses example material(s) that may be used for the primer layer(s) 31 and/or 32 in various example embodiments. However, other suitable materials, such as solder glass, other materials comprising bismuth oxide, and so forth, may be used for one or both primer layers 31 and/or 32 in various example embodiments. For example, Table 2 sets forth example ranges for various example elements and/or compounds for primer layer 31 and/or 32 material according to various example embodiments, for both mol % and weight %, after firing/sintering thereof and after hermetic edge seal 3 formation. It will be appreciated that other materials may be used together, or in place of, those shown below, and that the example percentages may be different in alternate embodiments.

TABLE 2

(example primer material after edge seal formation)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., Bi$_2$O$_3$ and/or other stoichiometry) | 0.5-50% | 1-12% or 1-20% | 4-9% | 5-50% or 55-95% | 20-40% or 70-80% | 20-35% or 70-80% |
| boron oxide (e.g., B$_2$O$_3$ and/or other stoichiometry) | 20-65% | 30-60% | 40-55% | 15-70% | 25-45% | 30-40% |
| Silicon oxide (e.g., SiO$_2$ and/or other stoichiometry) | 0-50% or 0-15% | 15-35% or 5-15% | 22-30% | 0-50% | 5-35% | 15-30% |
| Titanium oxide (e.g., TiO$_2$ and/or other stoichiometry) | 0-20% | 3-12% | 4-11% | 0-20% | 3-12% | 4-11% |

Other compounds may also be provided in this primer material. Certain elements may change during firing/sintering, and certain elements may at least partially burn off during processing prior to formation of the final edges seal 3. It will be appreciated that, as with other layers discussed herein, other materials may be used together, or in place of, those shown above, and that the example weight/mol percentages may be different in alternate embodiments. The ceramic sealing glass primer materials for layer(s) 31 and/or 32 are lead-free and/or substantially lead-free in certain example embodiments.

At least one getter 8 may be provided on either glass substrate 1 or 2. The getter may or may not be provided over a low-E coating in certain example embodiments. FIGS. 1-2 illustrate that an example thin film getter, which may be laser-activated, coil-activated, or otherwise activated, may be positioned in a trough/recess 9 formed in the underlying substrate (e.g., substrate 2) via laser etching, laser ablating, and/or mechanical drilling. Getter 8 may be a Ti-based, Ti-inclusive, V-based, V-inclusive, nickel-based, and/or nickel-inclusive getter in certain example embodiments.

In certain example embodiments, a getter 8 (e.g., thin film getter, pill-type getter, disc-type getter, or any other suitable getter) may be positioned adjacent the edge seal 3 (e.g., see FIGS. 1-2). This is advantageous in that it allows the getter 8 to be at least partially hidden by a window sash (not shown) around the edge of the panel in window applications, so as to be aesthetically pleasing, and the getter 8 length can be increased to accommodate vacuum insulating panels 100 with larger vision areas. Other getter approaches, such as a pill-type or disc-type getter opposing the pump-out tube on the opposite substrate so as to hide the getter behind the evacuation port sealing material and evacuation tube, may be used in certain example embodiments. However, a thin film getter 8 may be more desirable in certain example embodiments. A thin film getter can provide increased sorption surface area, which is particularly desirable for vacuum insulating panels, e.g., to deliver a longer up to a 20-year vacuum life due to outgassing or off-gassing of contaminants in the vacuum cavity 5 due to ultraviolet light exposure and/or temperature.

In an example embodiment, there may be provided a vacuum insulating panel (e.g., 100) which may comprise: a first glass substrate (e.g., 1 or 2); a second glass substrate (e.g., the other of 1 or 2); a plurality of spacers (e.g., 4) provided in a gap (e.g., 5) between at least the first and second substrates, wherein the gap (e.g., 5) is at pressure less than atmospheric pressure; a seal (e.g., 3) provided at least partially between at least the first and second substrates; and wherein each of the plurality of spacers (two, three, or more of spacers 4) may comprise ceramic material, and may comprise a compressive stress region (e.g., CS) and a tension stress region (e.g., CT), wherein compressive stress in at least part of the compressive stress region (e.g., CS) may be at least about 600 MPa, and tensile stress in at least part of the tension stress region (e.g., CT) may be at least about 25 MPa.

In an example embodiment, there may be provided a vacuum insulating panel (e.g., 100) which may comprise: a first glass substrate (e.g., 1 or 2); a second glass substrate (e.g., the other of 1 or 2); plurality of ceramic spacers (e.g., 4) provided in a gap (e.g., 5) between at least the first and second substrates, wherein the gap (e.g., 5) is at pressure less than atmospheric pressure; a seal (e.g., 3) provided at least partially between at least the first and second substrates; and wherein at least one of the plurality of ceramic spacers (e.g., 4) may be chemically strengthened (e.g., via at least one ion exchange process).

In an example embodiment, there may be provided a vacuum insulating panel (e.g., 100) which may comprise: a first glass substrate; a second glass substrate; a plurality of spacers (e.g., 4) provided in a gap (e.g., 5) between at least the first and second substrates, wherein the gap is at pressure less than atmospheric pressure; a seal (e.g., 3) provided at least partially between at least the first and second substrates; wherein at least one of the plurality of spacers (e.g., 4) may: be chemically strengthened, comprises glass, and have a Mohs hardness of from about 5.0 to 6.0; and wherein for at least one location in the panel spacing between adjacent spacers (e.g., 4) is at least about 45 mm, more preferably at least about 55 mm, and most preferably at least about 60 mm.

In the vacuum insulating panel of any of the preceding three paragraphs, for at least one of or for each of the plurality of spacers, compressive stress at a location adjacent an upper and/or lower surface of the spacer may be at least about 600 MPa, more preferably at least about 700 MPa, more preferably at least about 800 MPa, more preferably at least about 900 MPa.

In the vacuum insulating panel of any of the preceding four paragraphs, for at least one of or for each of the plurality of spacers, at a location about 10 μm into the spacer from an upper and/or lower surface of the spacer, compressive stress may be at least about 150 MPa, more preferably at least about 200 MPa, more preferably at least about 300 MPa, more preferably at least about 400 MPa.

In the vacuum insulating panel of any of the preceding five paragraphs, for at least one of or for each of the plurality of spacers, at a location about 10 μm into the spacer from an upper and/or lower surface of the spacer, compressive stress may be in a range of from about 150-700 MPa.

In the vacuum insulating panel of any of the preceding six paragraphs, for at least one of or for each of the plurality of spacers, compressive stress in at least part of the compressive stress region may be at least about 500 MPa, more preferably at least about 600 MPa, more preferably at least about 700 MPa, more preferably at least about 800 MPa, more preferably at least about 900 MPa.

In the vacuum insulating panel of any of the preceding seven paragraphs, for at least one of or for each of the plurality of spacers, compressive stress in at least part of the compressive stress region may be in a range of from about 500-1,000 MPa.

In the vacuum insulating panel of any of the preceding eight paragraphs, for at least one of or for each of the plurality of spacers, tensile stress in at least part of the tension stress region may be at least about 40 MPa, more preferably at least about 50 MPa, more preferably at least about 60 MPa.

In the vacuum insulating panel of any of the preceding nine paragraphs, for at least one of or for each of the plurality of spacers, tensile stress in at least part of the tension stress region may be in a range of from about 40-120 MPa and/or from about 40-90 MPa.

In the vacuum insulating panel of any of the preceding ten paragraphs, may have a thickness of from about 120-500 μm, more preferably from about 230-280 μm.

In the vacuum insulating panel of any of the preceding eleven paragraphs, spacing between adjacent spacers at at least one location in the panel may be at least 40 mm, more preferably at least 45 mm, more preferably at least 55 mm, more preferably at least 60 mm.

In the vacuum insulating panel of any of the preceding twelve paragraphs, the spacer(s) may comprise aluminosilicate glass, such as lithia aluminosilicate glass.

In the vacuum insulating panel of any of the preceding thirteen paragraphs, for at least one of or for each of the plurality of spacers, the spacer(s) may have a Mohs hardness of from about 4.5 to 6.5, more preferably from about 5.0 to 6.0.

In the vacuum insulating panel of any of the preceding fourteen paragraphs, for at least one of or for each of the plurality of spacers, the spacer(s) may be substantially transparent to visible light.

In the vacuum insulating panel of any of the preceding fifteen paragraphs, for at least one of or for each of the plurality of spacers, the spacer(s) may have a refractive index (n), at 550 nm, of from about 1.40 to 1.65, more preferably from about 1.45 to 1.55, and/or an extinction coefficient (k) of no greater than about 0.020, more preferably no greater than about 0.010.

In the vacuum insulating panel of any of the preceding sixteen paragraphs, for at least one of or for each of the plurality of spacers, the spacer(s) may have a depth of compression (DOC) of from about 50-120 μm. Each of the plurality of spacers may have a depth of compression (DOC), for compressive stress, of from about 50-100 µm, and at least one compressive layer with a depth of at least about 10 µm into the spacer.

In the vacuum insulating panel of any of the preceding seventeen paragraphs, for at least one of or for each of the plurality of spacers, the spacer(s) may be chemically strengthened, such as via one, two, or three ion exchanges.

In the vacuum insulating panel of any of the preceding eighteen paragraphs, each of the first and second glass substrates may comprise soda-lime-silica based float glass.

In the vacuum insulating panel of any of the preceding nineteen paragraphs, the seal may comprise first and second seal layers of different material which overlap each other. The seal may further comprise a third seal layer.

In the vacuum insulating panel of any of the preceding twenty paragraphs, the first and second glass substrates may comprise tempered glass substrates or heat strengthened glass substrates.

In the vacuum insulating panel of any of the preceding twenty-one paragraphs, the seal may be a hermetic edge seal of the vacuum insulating panel.

In the vacuum insulating panel of any of the preceding twenty-two paragraphs, the panel may be configured for use in a window.

In the vacuum insulating panel of any of the preceding twenty-three paragraphs, at least one of the spacers, in at least one location in its thickness, may comprise from about 5.0-9.0 wt. % lithium oxide (e.g., $Li_2O$ or other suitable stoichiometry), from about 5.0-10.0 wt. % aluminum oxide (e.g., $Al_2O_3$ or other suitable stoichiometry), and from about 66.0-72.0 silicon oxide (e.g., $SiO_2$ or other suitable stoichiometry).

In the vacuum insulating panel of any of the preceding twenty-four paragraphs, the compressive stress region may comprise first and second compressive stress regions, and the tension stress region may be sandwiched between the first and second compressive stress regions. Compressive stress may be at least about 600 MPa in at least part of each of the first and second compressive stress regions.

It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). Terms, such as "first", "second", and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Or" as used herein may cover both "and" and "or."

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:
a first glass substrate;
a second glass substrate;
a plurality of spacers provided in a gap between at least the first and second substrates, wherein the gap is at pressure less than atmospheric pressure;
a seal provided at least partially between at least the first and second substrates; and
wherein each of the plurality of spacers comprises ceramic material, and comprises a compressive stress region and a tension stress region, wherein compressive stress in at least part of the compressive stress region is at least about 600 MPa, and tensile stress in at least part of the tension stress region is at least about 25 MPa.

2. The vacuum insulating panel of claim 1, wherein, for each of the plurality of spacers, compressive stress at a location adjacent an upper and/or lower surface of the spacer is at least about 700 MPa.

3. The vacuum insulating panel of claim 1, wherein, for each of the plurality of spacers, compressive stress at a location adjacent an upper and/or lower surface of the spacer is at least about 800 MPa.

4. The vacuum insulating panel of claim 1, wherein, for each of the plurality of spacers, compressive stress at a location adjacent an upper and/or lower surface of the spacer is at least about 900 MPa.

5. The vacuum insulating panel of claim 1, wherein, for each of the plurality of spacers, at a location about 10 µm into the spacer from an upper and/or lower surface of the spacer, compressive stress is at least about 150 MPa.

6. The vacuum insulating panel of claim 1, wherein, for each of the plurality of spacers, at a location about 10 µm into the spacer from an upper and/or lower surface of the spacer, compressive stress is at least about 200 MPa.

7. The vacuum insulating panel of claim 1, wherein, for each of the plurality of spacers, at a location about 10 μm into the spacer from an upper and/or lower surface of the spacer, compressive stress is at least about 300 MPa.

8. The vacuum insulating panel of claim 1, wherein, for each of the plurality of spacers, at a location about 10 μm into the spacer from an upper and/or lower surface of the spacer, compressive stress is at least about 400 MPa.

9. The vacuum insulating panel of claim 1, wherein, for each of the plurality of spacers, at a location about 10 μm into the spacer from an upper and/or lower surface of the spacer, compressive stress is in a range of from about 150-700 MPa.

10. The vacuum insulating panel of claim 1, wherein compressive stress in at least part of the compressive stress region is at least about 700 MPa.

11. The vacuum insulating panel of claim 1, wherein compressive stress in at least part of the compressive stress region is at least about 800 MPa.

12. The vacuum insulating panel of claim 1, wherein compressive stress in at least part of the compressive stress region is at least about 900 MPa.

13. The vacuum insulating panel of claim 1, wherein compressive stress in at least part of the compressive stress region is in a range of from about 600-1,000 MPa.

14. The vacuum insulating panel of claim 1, wherein tensile stress in at least part of the tension stress region is at least about 40 MPa.

15. The vacuum insulating panel of claim 1, wherein tensile stress in at least part of the tension stress region is at least about 50 MPa.

16. The vacuum insulating panel of claim 1, wherein tensile stress in at least part of the tension stress region is at least about 60 MPa.

17. The vacuum insulating panel of claim 1, wherein tensile stress in at least part of the tension stress region is in a range of from about 40-90 MPa.

18. The vacuum insulating panel of claim 1, wherein each of the plurality of spacers has a thickness of from about 120-500 μm.

19. The vacuum insulating panel of claim 1, wherein each of the plurality of spacers has a thickness of from about 230-280 μm.

20. The vacuum insulating panel of claim 1, wherein the compressive stress region comprises first and second compressive stress regions, and wherein the tension stress region is sandwiched between the first and second compressive stress regions; and
wherein compressive stress is at least about 600 MPa in at least part of each of the first and second compressive stress regions.

21. The vacuum insulating panel of claim 1, wherein spacing between adjacent spacers for at least one location in the panel is at least 40 mm.

22. The vacuum insulating panel of claim 1, wherein spacing between adjacent spacers at for least one location in the panel is at least 45 mm.

23. The vacuum insulating panel of claim 1, wherein spacing between adjacent spacers at for least one location in the panel is at least 55 mm.

24. The vacuum insulating panel of claim 1, wherein spacing between adjacent spacers for at least one location in the panel is at least 60 mm.

25. The vacuum insulating panel of claim 1, wherein each of the plurality of spacers comprises aluminosilicate glass.

26. The vacuum insulating panel of claim 1, wherein each of the plurality of spacers comprises lithia aluminosilicate glass.

27. The vacuum insulating panel of claim 1, wherein each of the plurality of spacers, in at least one location in its thickness, comprises from about 5.0-9.0 wt. % lithium oxide, from about 5.0-10.0 wt. % aluminum oxide, and from about 66.0-72.0 silicon oxide.

28. The vacuum insulating panel of claim 1, wherein each of the plurality of spacers has a Mohs hardness of from about 4.5 to 6.5.

29. The vacuum insulating panel of claim 1, wherein each of the plurality of spacers has a Mohs hardness of from about 5.0 to 6.0.

30. The vacuum insulating panel of claim 1, wherein each of the plurality of spacers is substantially transparent to visible light.

31. The vacuum insulating panel of claim 1, wherein each of the plurality of spacers has a refractive index (n), at 550 nm, of from about 1.40 to 1.65.

32. The vacuum insulating panel of claim 1, wherein each of the plurality of spacers has a refractive index (n), at 550 nm, of from about 1.45 to 1.55.

33. The vacuum insulating panel of claim 1, wherein each of the plurality of spacers has an extinction coefficient (k) of no greater than about 0.010.

34. The vacuum insulating panel of claim 1, wherein each of the plurality of spacers has a depth of compression (DOC) of from about 50-120 μm.

35. The vacuum insulating panel of claim 1, wherein each of the plurality of spacers has a depth of compression (DOC), for compressive stress, of from about 50-100 μm, and at least one compressive layer with a depth of at least about 10 μm into the spacer.

36. The vacuum insulating panel of claim 1, wherein each of the plurality of spacers is chemically strengthened.

37. The vacuum insulating panel of claim 1, wherein each of the plurality of spacers is chemically strengthened by at least one ion exchange.

38. The vacuum insulating panel of claim 1, wherein each of the plurality of spacers is chemically strengthened by at least two ion exchanges.

39. The vacuum insulating panel of claim 1, wherein each of the plurality of spacers comprises an upper surface and a lower surface that are substantially parallel to each other.

40. The vacuum insulating panel of claim 1, wherein each of the first and second glass substrates comprises soda-lime-silica based float glass.

41. The vacuum insulating panel of claim 1, wherein the seal comprises first and second seal layers of different material which overlap each other.

42. The vacuum insulating panel of claim 41, wherein the seal further comprises a third seal layer.

43. The vacuum insulating panel of claim 1, wherein each of the plurality of spacers comprises a Youngs Modulus of about from 65 GPa to about 88 GPa and Shear Modulus from about 20 GPa to about 40 GPa, to reduce spacer induced defects.

44. The vacuum insulating panel of claim 1, wherein the first and second glass substrates comprise tempered glass substrates or heat strengthened glass substrates.

45. The vacuum insulating panel of claim 1, wherein the seal is a hermetic edge seal of the vacuum insulating panel.

46. The vacuum insulating panel of claim 1, wherein the panel is configured for use in a window.

47. A vacuum insulating panel comprising:
a first glass substrate;
a second glass substrate;
a plurality of ceramic spacers provided in a gap between at least the first and second substrates, wherein the gap is at pressure less than atmospheric pressure;
a seal provided at least partially between at least the first and second substrates; and
wherein at least one of the plurality of ceramic spacers is chemically strengthened and comprises a compressive stress region and a tension stress region, wherein compressive stress in at least part of the compressive stress region is at least about 600 MPa, and tensile stress in at least part of the tension stress region is at least about 25 MPa.

48. The vacuum insulating panel of claim 47, wherein the at least one of the plurality of spacers comprises aluminosilicate glass.

49. The vacuum insulating panel of claim 47, wherein the at least one of the plurality of spacers comprises lithia aluminosilicate glass.

50. The vacuum insulating panel of claim 47, wherein the at least one of the plurality of spacers is chemically strengthened by at least one ion exchange.

51. The vacuum insulating panel of claim 47, wherein the at least one of the plurality of spacers is chemically strengthened by at least two ion exchanges.

52. The vacuum insulating panel of claim 47, wherein, for the at least one of the plurality of spacers, compressive stress at a location proximate an upper and/or lower surface of the spacer is at least about 600 MPa.

53. The vacuum insulating panel of claim 47, wherein, for the at least one of the plurality of spacers, compressive stress at a location proximate an upper and/or lower surface of the spacer is at least about 700 MPa.

54. The vacuum insulating panel of claim 47, wherein, for the at least one of the plurality of spacers, tensile stress in at least part of the tension stress region is at least about 40 MPa.

55. The vacuum insulating panel of claim 47, wherein, for the at least one of the plurality of spacers, tensile stress in at least part of the tension stress region is at least about 50 MPa.

56. The vacuum insulating panel of claim 47, wherein, for the at least one of the plurality of spacers, tensile stress in at least part of the tension stress region is at least about 60 MPa.

57. The vacuum insulating panel of claim 47, wherein, for the at least one of the plurality of spacers, tensile stress in at least part of the tension stress region is in a range of from about 40-90 MPa.

58. A vacuum insulating panel comprising:
a first glass substrate;
a second glass substrate;
a plurality of spacers provided in a gap between at least the first and second substrates, wherein the gap is at pressure less than atmospheric pressure;
a seal provided at least partially between at least the first and second substrates;
wherein at least one of the plurality of spacers is chemically strengthened, comprises glass, has tensile stress in at least part of a tension stress region of at least about 40 MPa, and has a Mohs hardness of from about 5.0 to 6.0; and
wherein for at least one location in the panel, spacing between adjacent spacers is at least about 55 mm.

* * * * *